US008713113B2

(12) United States Patent
Shimoda

(10) Patent No.: US 8,713,113 B2
(45) Date of Patent: Apr. 29, 2014

(54) COMMUNICATION TERMINAL DEVICE, AND RECORDING MEDIUM

(75) Inventor: Nozomu Shimoda, Kanagawa (JP)

(73) Assignee: NEC Casio Mobile Communications, Ltd., Kanagawa (JP)

( * ) Notice: Subject to any disclaimer, the term of this patent is extended or adjusted under 35 U.S.C. 154(b) by 629 days.

(21) Appl. No.: 12/851,911

(22) Filed: Aug. 6, 2010

(65) Prior Publication Data

US 2011/0060799 A1   Mar. 10, 2011

(30) Foreign Application Priority Data

Aug. 7, 2009   (JP) ................................ 2009-184388

(51) Int. Cl.
  *G06F 15/16*   (2006.01)
(52) U.S. Cl.
  USPC ........................................................ 709/206
(58) Field of Classification Search
  USPC ................................................. 709/203–206
  See application file for complete search history.

(56) References Cited

U.S. PATENT DOCUMENTS

| | | | | |
|---|---|---|---|---|
| 7,693,942 | B2 * | 4/2010 | Nale ............................... | 709/206 |
| 8,363,952 | B2 * | 1/2013 | Bigioi et al. ................... | 382/190 |
| 2004/0119826 | A1 * | 6/2004 | Yunoki ...................... | 348/207.1 |
| 2004/0156535 | A1 * | 8/2004 | Goldberg et al. ............. | 382/115 |
| 2004/0243671 | A9 * | 12/2004 | Needham et al. ............. | 709/204 |
| 2005/0144291 | A1 * | 6/2005 | Frank et al. ................... | 709/227 |
| 2007/0268309 | A1 * | 11/2007 | Tanigawa et al. ............. | 345/619 |
| 2009/0080716 | A1 * | 3/2009 | Yanagi ........................... | 382/118 |
| 2009/0198359 | A1 * | 8/2009 | Chaudhri ........................ | 700/94 |
| 2011/0269509 | A1 * | 11/2011 | Zinn et al. ..................... | 455/566 |
| 2012/0321196 | A1 * | 12/2012 | Tanigawa et al. ............. | 382/195 |

FOREIGN PATENT DOCUMENTS

| | | |
|---|---|---|
| JP | 10-289243 | 10/1998 |
| JP | 2001-265697 | 9/2001 |
| JP | 2002-215643 | 8/2002 |
| JP | 2004-326281 | 11/2004 |
| JP | 2004-356985 | 12/2004 |
| JP | 2005-267146 | 9/2005 |
| JP | 2005-301647 | 10/2005 |
| JP | 2007-028077 | 2/2007 |
| JP | 2008-005470 | 1/2008 |
| JP | 2008-311885 | 12/2008 |

OTHER PUBLICATIONS

Tamaru Shinichi, Translation of JP Publication No. 2005-267146, Sep. 29, 2005, pp. 1-6.*
Office Action dated Nov. 20, 2012 issued by the Japanese Patent Office in corresponding Japanese Patent Application No. 2009-184388 with partial English translation, 3 pages.

* cited by examiner

*Primary Examiner* — Joshua Joo
(74) *Attorney, Agent, or Firm* — Young & Thompson

(57) ABSTRACT

When a user selects an image, a control unit detects a face image from the selected image and acquires person data corresponding to the face image. Moreover, the control unit specifies address book data of the person and acquires an e-mail address from the address book data. When the user inputs an e-mail address, the control unit also has a function of detecting an image in which a person having the input e-mail address as a destination is an imaged object and creating an e-mail attached with the image.

3 Claims, 26 Drawing Sheets

FIG.4

ADDRESS BOOK DATA STORAGE AREA 202

| ADDRESS BOOK ID | NAME | PHONE NUMBER | E-MAIL ADDRESS |
|---|---|---|---|
| A01 | A | 03-xxx-xxxx | A@mail.com |
| A02 | B | 03-yyy-yyyy | B@mail.com |
| A03 | C | 090-zzz-zzzz | C@mail.com |
| A04 | D | 080-zzz-zzzz | |

FIG.6

ASSOCIATION INFORMATION

| IMAGE ID | PERSON ID | ADDRESS BOOK ID |
|---|---|---|
| I01 | P01 | A01 |
| I02 | P02 | |
| I03 | P03 | A03 |
| ... | ... | ... |

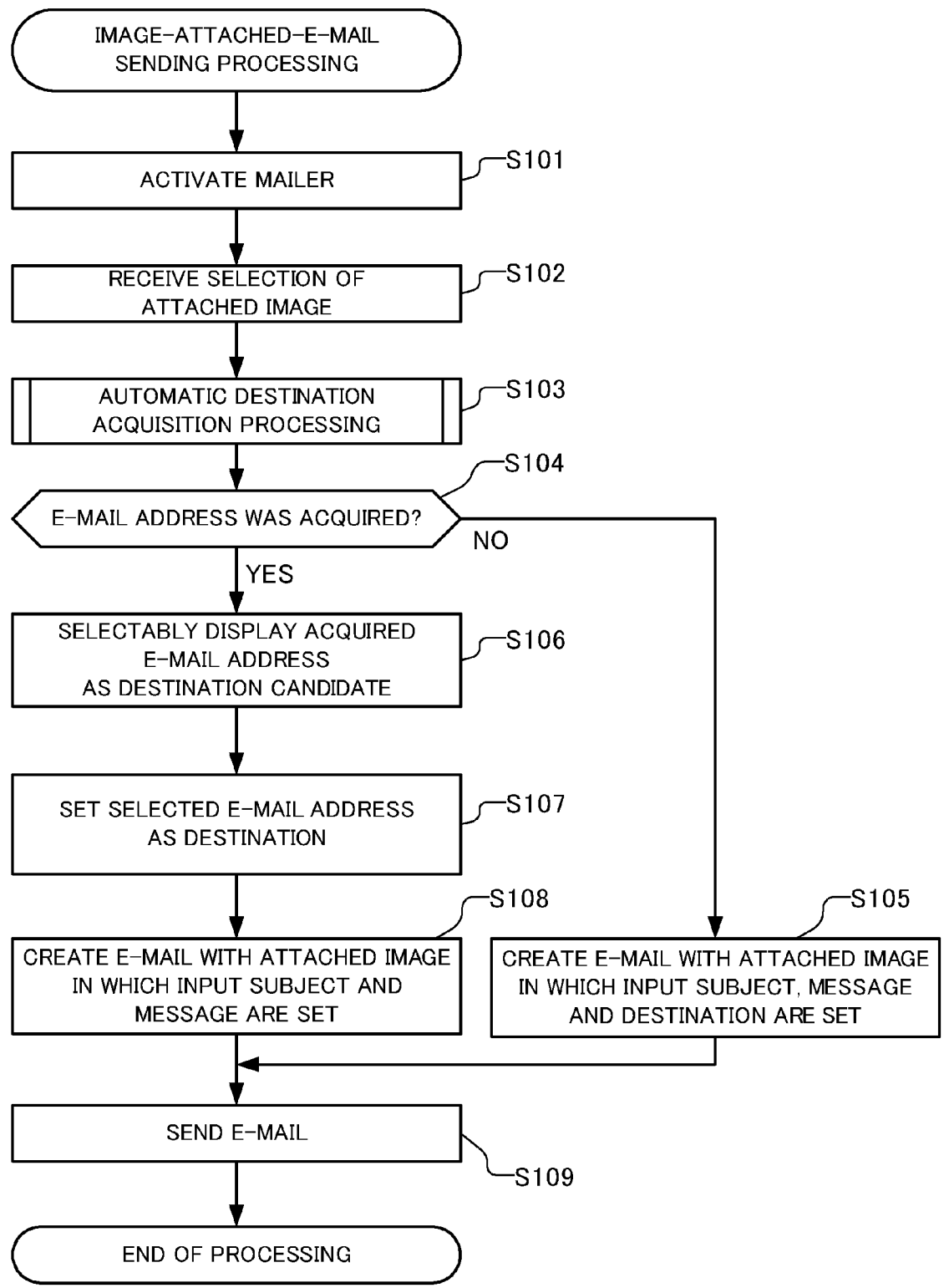

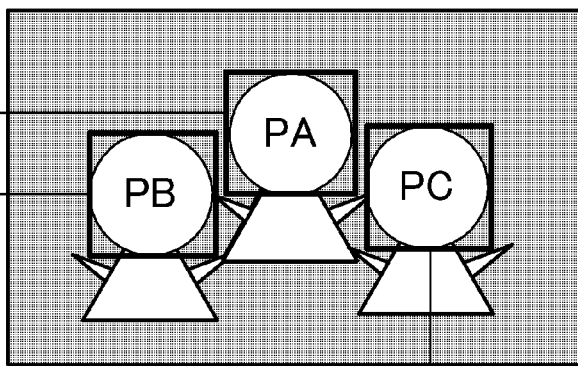
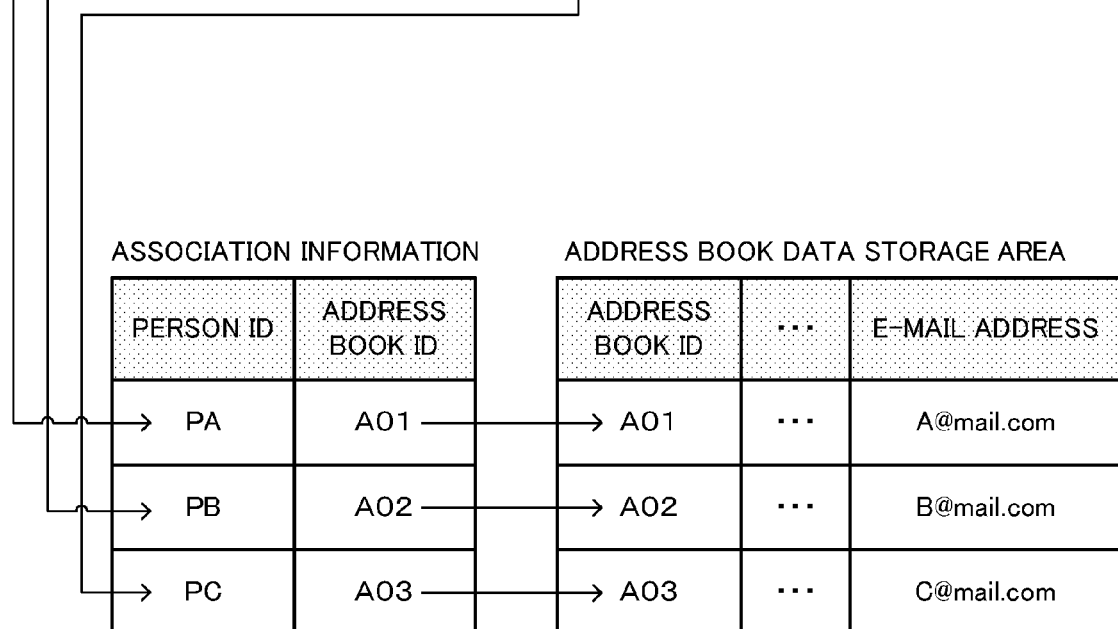
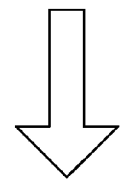
FIG.10A
FIG.10B    FIG.10C
TO FIG.10D

FROM FIG.10C
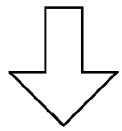
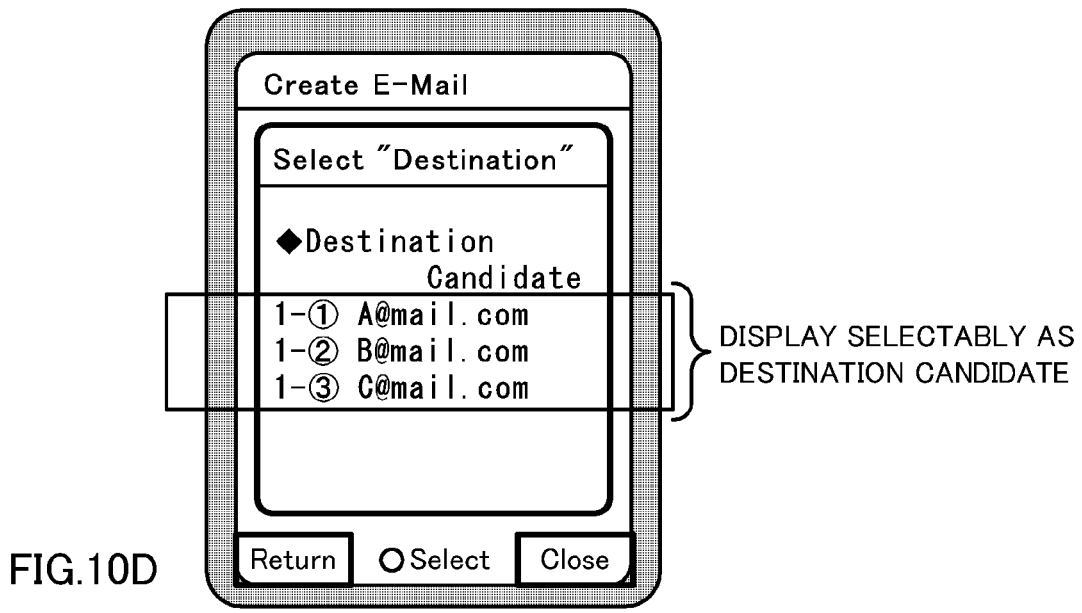
FIG.10D
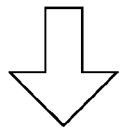
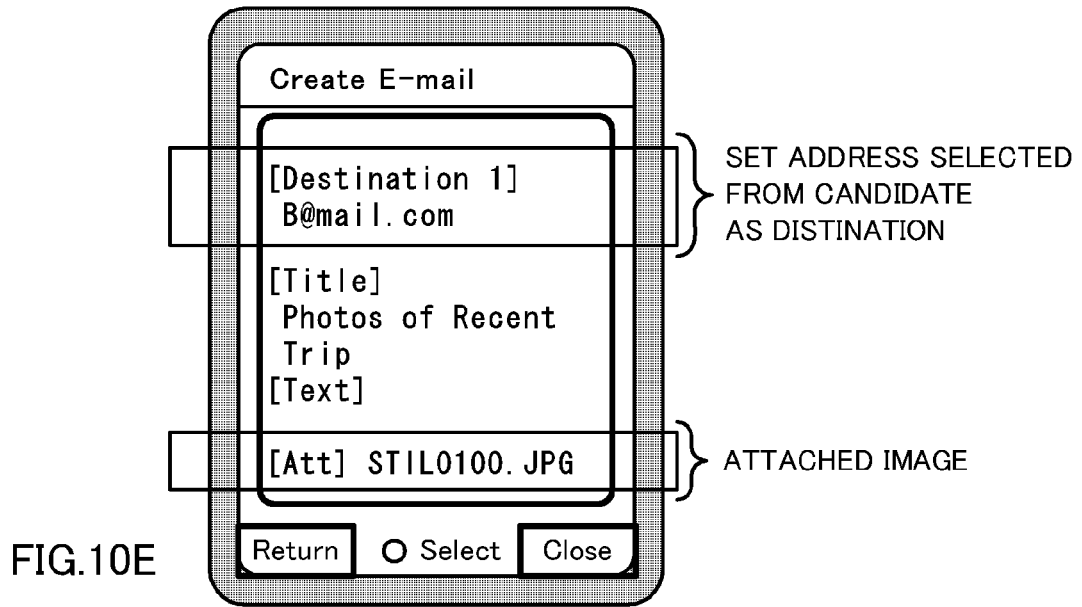
FIG.10E

ASSIGN HIGHER RANK TO ONE CLOSER TO CENTER OF IMAGE

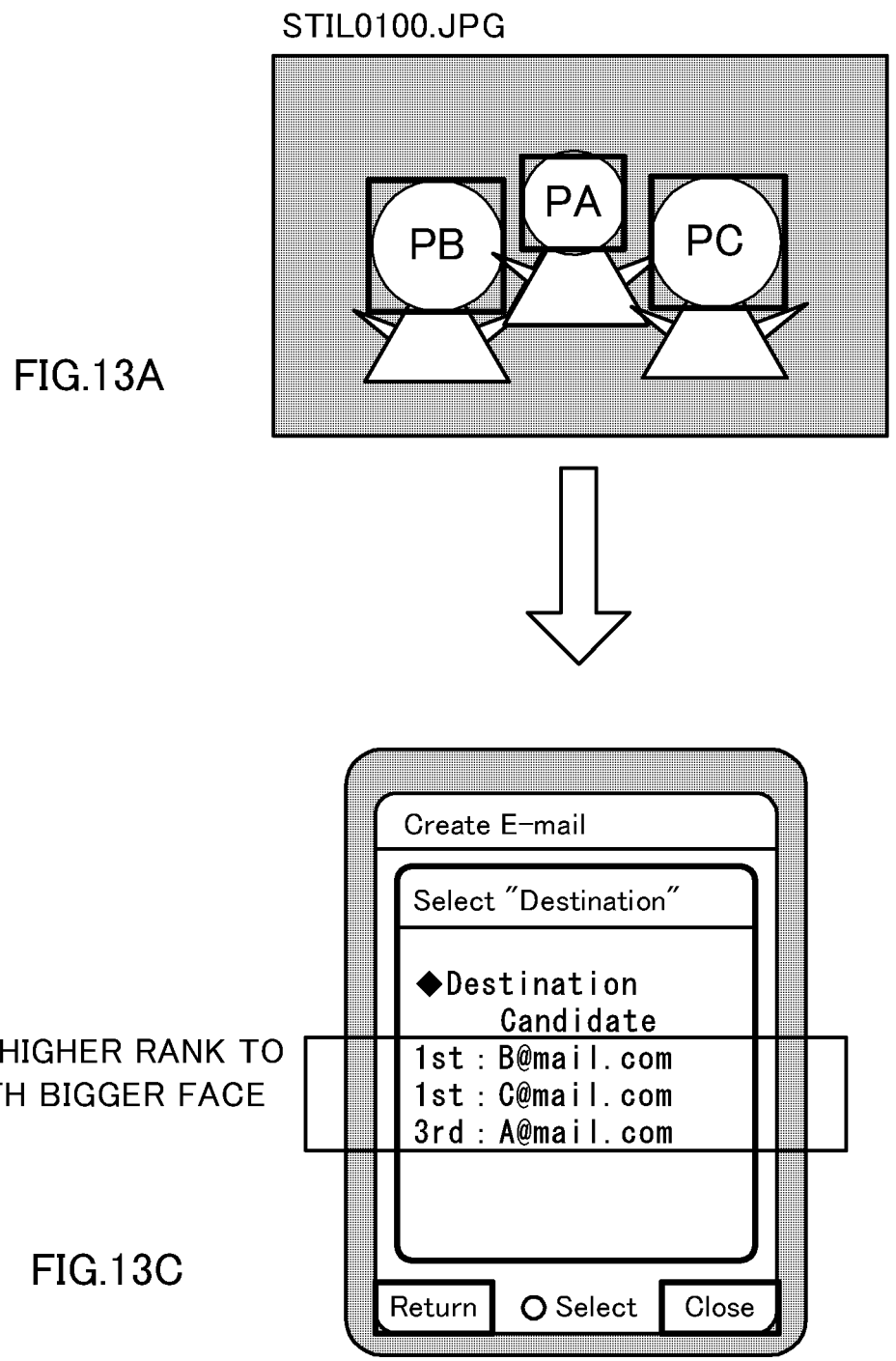

AE/AF CONTROL HISTORY INFORMATION

| IMAGE FILE NAME : STILL IMAGE | AE/AF CONTROLLED PERSON ID |
|---|---|
| STIL0999.JPG | PA,PB |
| STIL1000.JPG | PC |
| : | : |

FIG.15A

AE/AF CONTROL HISTORY INFORMATION

| IMAGE FILE NAME : MOVING IMAGE | AE/AF CONTROLLED PERSON ID | AE OPERATION TIME | AF OPERATION TIME |
|---|---|---|---|
| MOVE001.m2ts | PA,PI | PA: 10 SEC<br>PI: 5 SEC | PA: 12 SEC<br>PI: 7 SEC |
| MOVE002.m2ts | PD,PI | PD: 16 SEC<br>PI: 8 SEC | PD: 20 SEC<br>PI: 12SEC |
| : | : | : | : |

FIG.15B

ASSOCIATION INFORMATION
| ADDRESS BOOK ID | IMAGE | IMAGE |
|---|---|---|
| A01 | MOVE001.m2ts | MOVE002.m2ts |
FROM FIG.19B ------>
FIG.19C
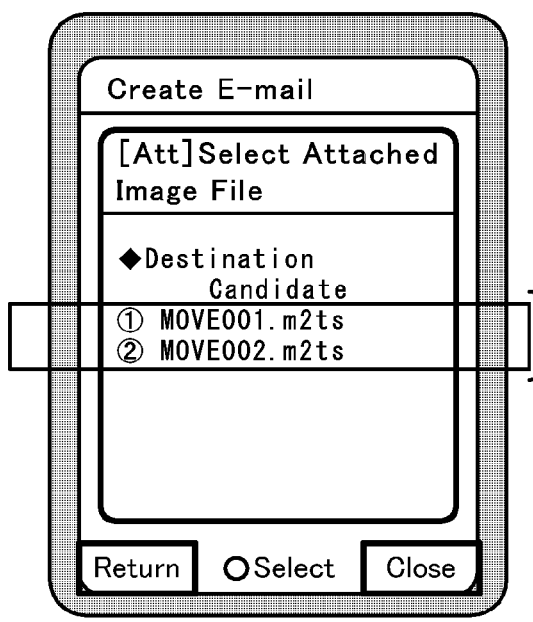
DISPLAY DESTINATION CANDIDATE SELECTABLY AS ATTACHED IMAGE CANDIDATE
FIG.19D
ATTACH IMAGE SELECTED FROM CANDIDATE TO E-MAIL
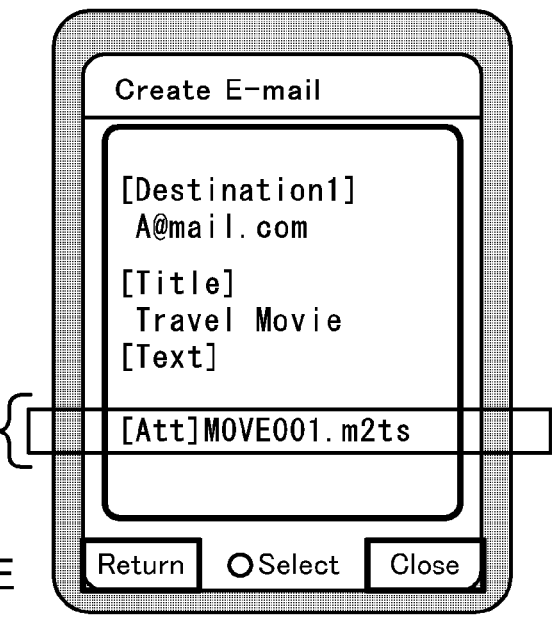
FIG.19E

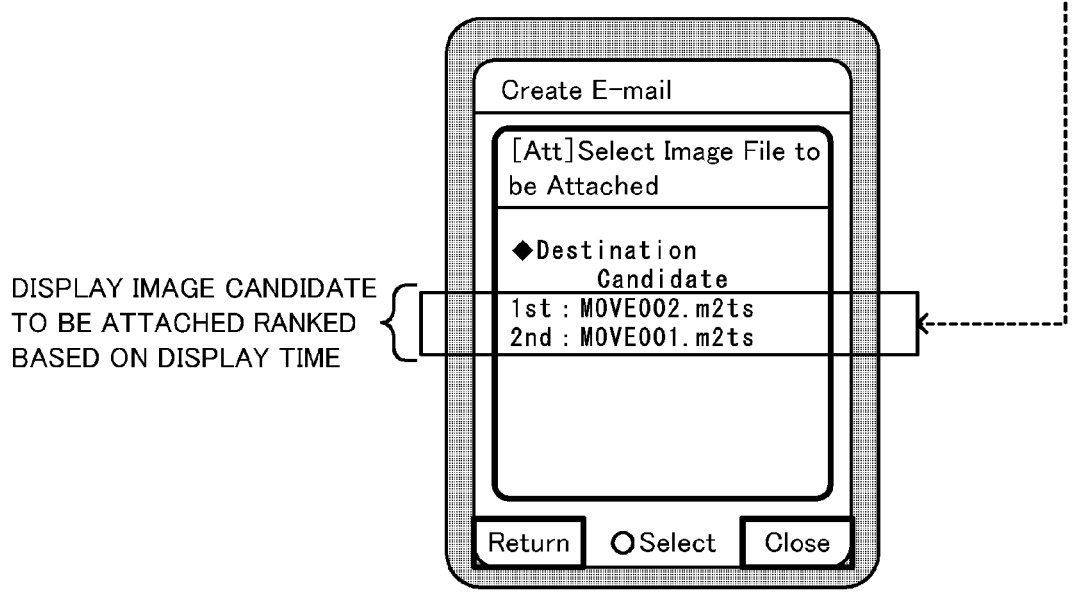

COMMUNICATION TERMINAL DEVICE, AND RECORDING MEDIUM

This application claims the benefit of Japanese Patent Application No. 2009-184388 filed on Aug. 7, 2009, the entire disclosure of which is incorporated by reference herein.

TECHNICAL FIELD

This application relates to a communication terminal device to create an e-mail attached with an image, and a recording medium.

BACKGROUND ART

Sending an e-mail with an image from a mobile phone and the like is being performed.

In many cases, such an e-mail with an image is often desired to be sent to an imaged person in the image. Unexamined Japanese Patent Application KOKAI Publication No. 2004-326281 discloses an image distribution server in which an imaged person is specified by an image attached to an e-mail received by a user terminal, and an e-mail with the image is sent to the specified person.

Unexamined Japanese Patent Application KOKAI Publication No. 2004-356985 discloses a camera imaging device in which an image related to a person specified by a user is selected and an e-mail with the selected image is sent to the specified person.

In the example disclosed in Unexamined Japanese Patent Application KOKAI Publication No. 2004-326281, an e-mail is sent to all the persons that were specified by an image attached to an e-mail. Therefore, although it is convenient for a user to automatically determine a destination, an e-mail may be sent to a person whom the user does not want to send to.

In the example disclosed in Unexamined Japanese Patent Application KOKAI Publication No. 2004-356985, all images related to a specified person are attached to an e-mail, and the e-mail is sent. Therefore, although it is convenient for a user to automatically determine attached images, an image that the user does not want to send may be attached to the e-mail and sent.

SUMMARY

An exemplary object of the present invention is to provide a communication terminal device and a recording medium that have a convenience of automatically determining a destination of an e-mail from an attached image and also can prevent an e-mail from being sent to a destination to which a user does not intend to send.

Another exemplary object of the present invention is to provide a communication terminal device and a recording medium that have a convenience of automatically determining an image to be attached from a destination of an e-mail and also can prevent an attached image that the user does not intend to send from being sent.

In order to achieve the aforementioned objects, a communication terminal device according to a first exemplary aspect of the present invention includes storing images and e-mail addresses so that a selection unit receives a user's selection of an image to be attached to an e-mail from the stored images. Image object detection detects information that specifies an imaged person in the attached selected image. An e-mail address of the imaged person is acquired from the stored e-mail addresses on the basis of the stored detected information. The acquired e-mail addresses are displayed as destination candidates of the e-mail with the attached image so as to be selected by the user and an e-mail address is selected by the user from the e-mail addresses selectably displayed as a destination of the e-mail with the attached image.

BRIEF DESCRIPTION OF THE DRAWINGS

FIG. 4 is a diagram illustrating an example of the data stored in an address book data storage area;

FIG. 6 is a diagram illustrating an example of association information;

FIG. 7 is a flow chart of an e-mail with an attached image sending processing;

FIGS. 10A to 10E are diagrams specifically illustrating an automatic destination setting processing;

FIGS. 13A to 13C are diagrams illustrating an example in which e-mail addresses are ranked as destination candidates and selectably displayed;

FIGS. 15A and 15B are diagrams illustrating one example of AE/AF control history information;

FIGS. 19A to 19E are diagrams specifically illustrating an automatic image acquisition processing; and FIGS. 20A to 20D are diagrams specifically illustrating an automatic image acquisition processing according to an association degree.

EXEMPLARY EMBODIMENT

Embodiments of the present invention will be described with reference to drawings. The present invention is not limited to the following embodiments and drawings. It should be apparent that the following embodiments and drawings can be modified without departing from the principles of the present invention.

A communication terminal device 1 of an embodiment of the present application will be described below. The communication terminal device 1 of the present embodiment denotes a mobile phone. The communication terminal device 1 may be a personal handy-phone system (PHS), a personal digital assistant (PDA), a personal computer (PC) and the like.

Figure 1:
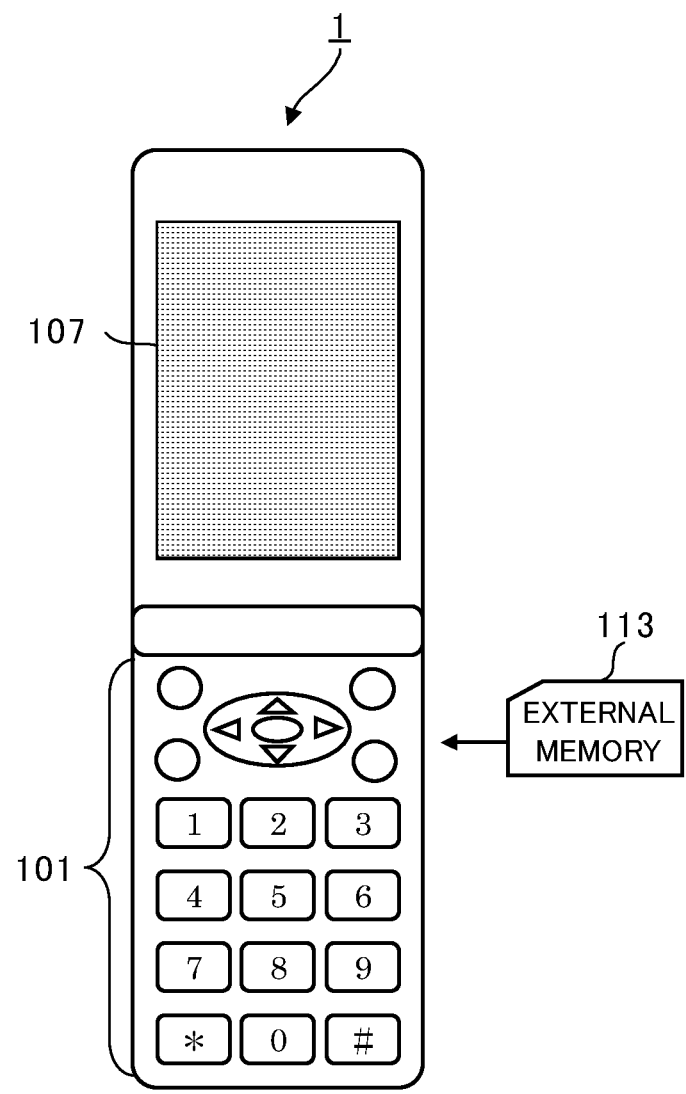
FIG. 1 is a schematic diagram of a communication terminal device of an embodiment of the present invention.
Figure 2:
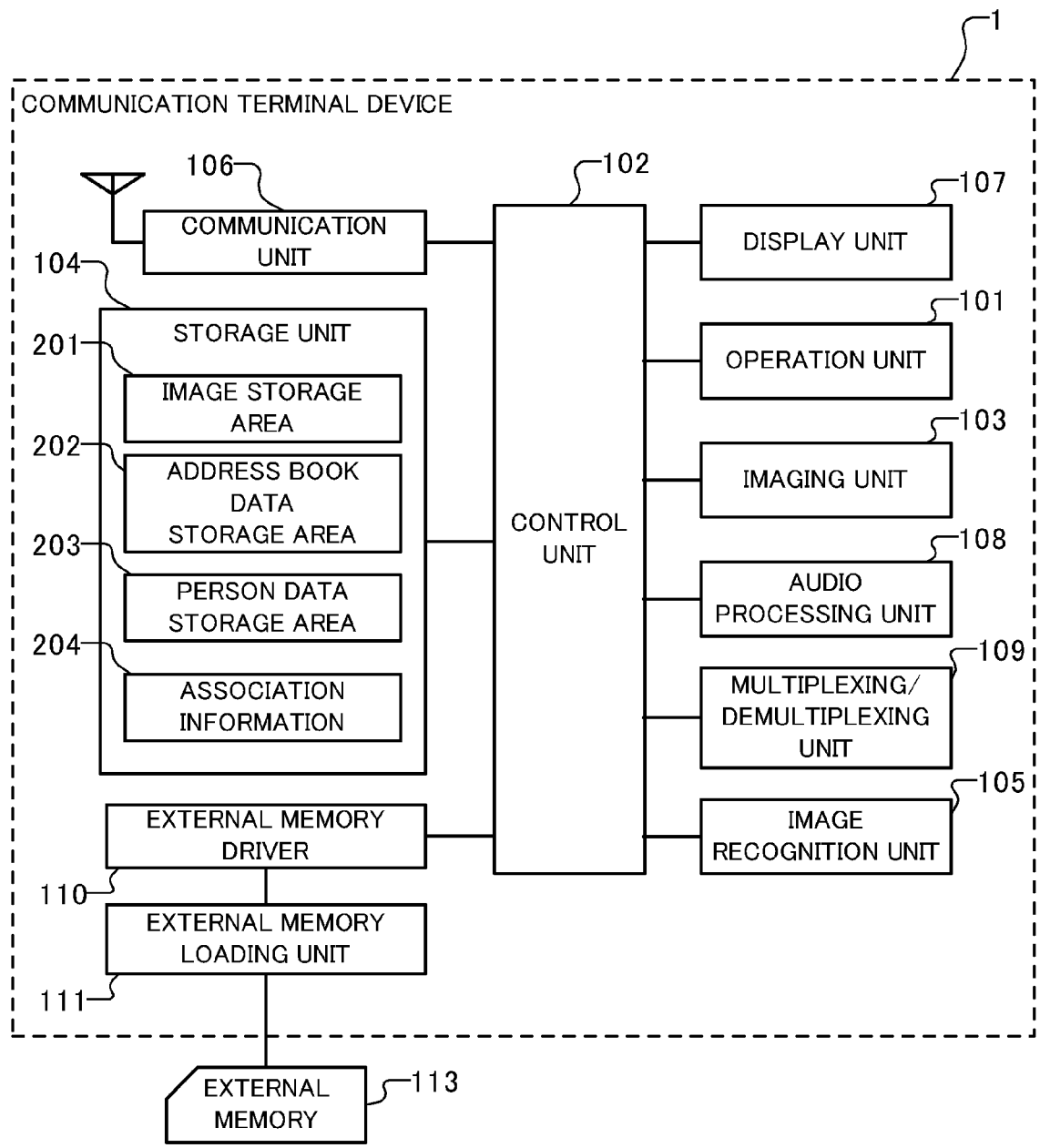
FIG. 2 is a block diagram of a communication terminal device of an embodiment of the present invention.

FIG. 1 is a schematic diagram of the communication terminal device 1 and FIG. 2 is a block diagram illustrating a configuration of the communication terminal device 1. The communication terminal device 1 includes an operation unit 101, a control unit 102, an imaging unit 103, a storage unit 104, an image recognition unit 105, a communication unit 106, a display unit 107, an audio processing unit 108, a multiplexing/demultiplexing unit 109, an external memory driver 110 and an external memory loading unit 111.

The operation unit 101 includes various key buttons and denotes an input unit for inputting telephone numbers and other information. The operation unit 101 is used when a user performs any operation on the communication terminal device 1 such as turning on/off a mobile phone and imaging an object.

The control unit 102 includes a central processing unit (CPU) and controls the entire operation of the communication terminal device 1 on the basis of a program stored in the storage unit 104. For example, the control unit 102 controls each unit in response to a signal from the operation unit 101 operated by the user. The control unit 102 also activates a software for creating an e-mail (Mailer) to create and send an e-mail.

The imaging unit 103 includes a charge coupled device (CCD), an A/D converter and the like, and converts an optical signal having image information of an imaged object to an analog electrical signal, and converts the analog electrical signal to a digital signal. For example, the imaging unit 103 images an object such as a person's face, a landscape and a character, and converts the imaged object to a digital signal having image information that can be used in the control unit 102. Then, the converted image information is output in the display unit 107 as necessary.

The display unit 107 includes, for example, a liquid crystal display (LCD), an electro-luminescence (EL) display and the like and displays an image captured by the imaging unit 103 and identification information recognized by the aftermentioned image recognition unit 105.

The display unit 107 also displays various necessary information for utilizing functions of the communication terminal device (for example, an operational status such as a power status, a radio wave intensity, a remaining battery power, a server connection status, an unread e-mail and the like, an input phone number, an e-mail destination, a message of e-mail sent and the like, and received data such as a moving image, a still image, an incoming phone number of a calling party, a received e-mail message, a received data such as a screen page on a connected internet and the like). When capturing an image with the communication terminal device 1, the user selects an image that the user wants to capture while monitoring image information output to the display unit 107. Then, the user gives instructions of imaging, for example, by pushing down an operational key assigned as a shutter key (hereinafter referred to as a shutter key) and the like. When the shutter key is pushed down, the imaging unit 103 captures an image of an object, and its image information is stored in the storage unit 104. The display unit 107 may be composed of two display units such as main and sub display units or may be composed of more than two display units 107.

The storage unit 104 is, for example, composed of a read only memory (ROM) and a random access memory (RAM) and the like and stores data, a software such as Mailer, a program and the like that are used by the communication terminal device 1. The storage unit 104 also stores a template image necessary for image processing. The template imitates, for example, eyes, nose and mouth of a person and is used to extract a person's face image from an image.

The storage unit 104 includes an image storage area 201, an address book data storage area 202 and a person data storage area 203.

Figure 3:
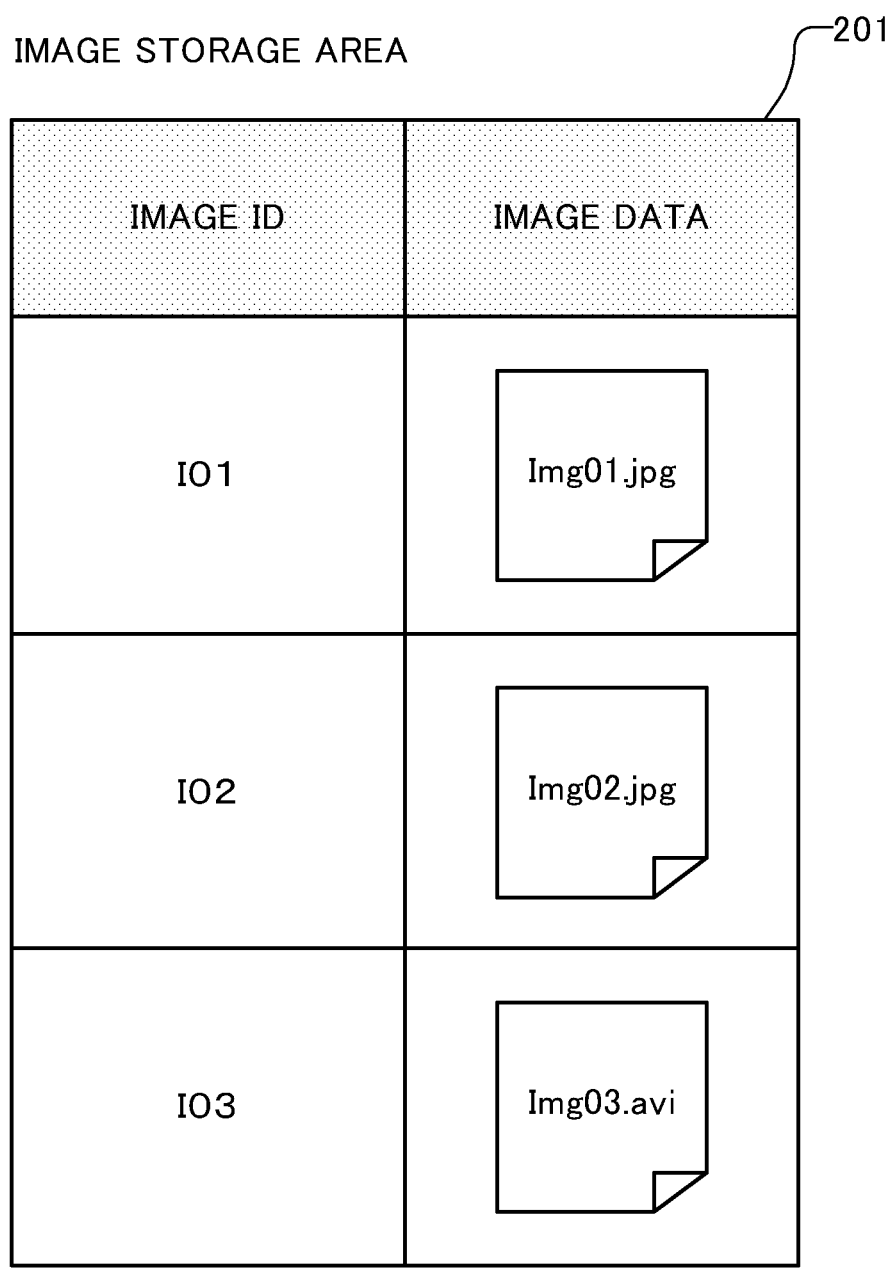
FIG. 3 is a diagram illustrating an example of the data stored in an image storage area.

The image storage area 201 stores images (still images and moving images) mainly captured by the imaging unit 103 as illustrated in FIG. 3. Each of the images is provided with an ID (an image ID) for uniquely identifying the image.

The address book data storage area 202 stores address book data in which an address book ID, a name of a person, a phone number, an e-mail address and the like correspond to each person such as a calling partner, as illustrated in FIG. 4. The address book ID uniquely identifies an address book data. In an example of FIG. 4, the user has not yet set an e-mail address for address book data in address book ID "A04" and therefore its e-mail address section is blank.

Figure 5:
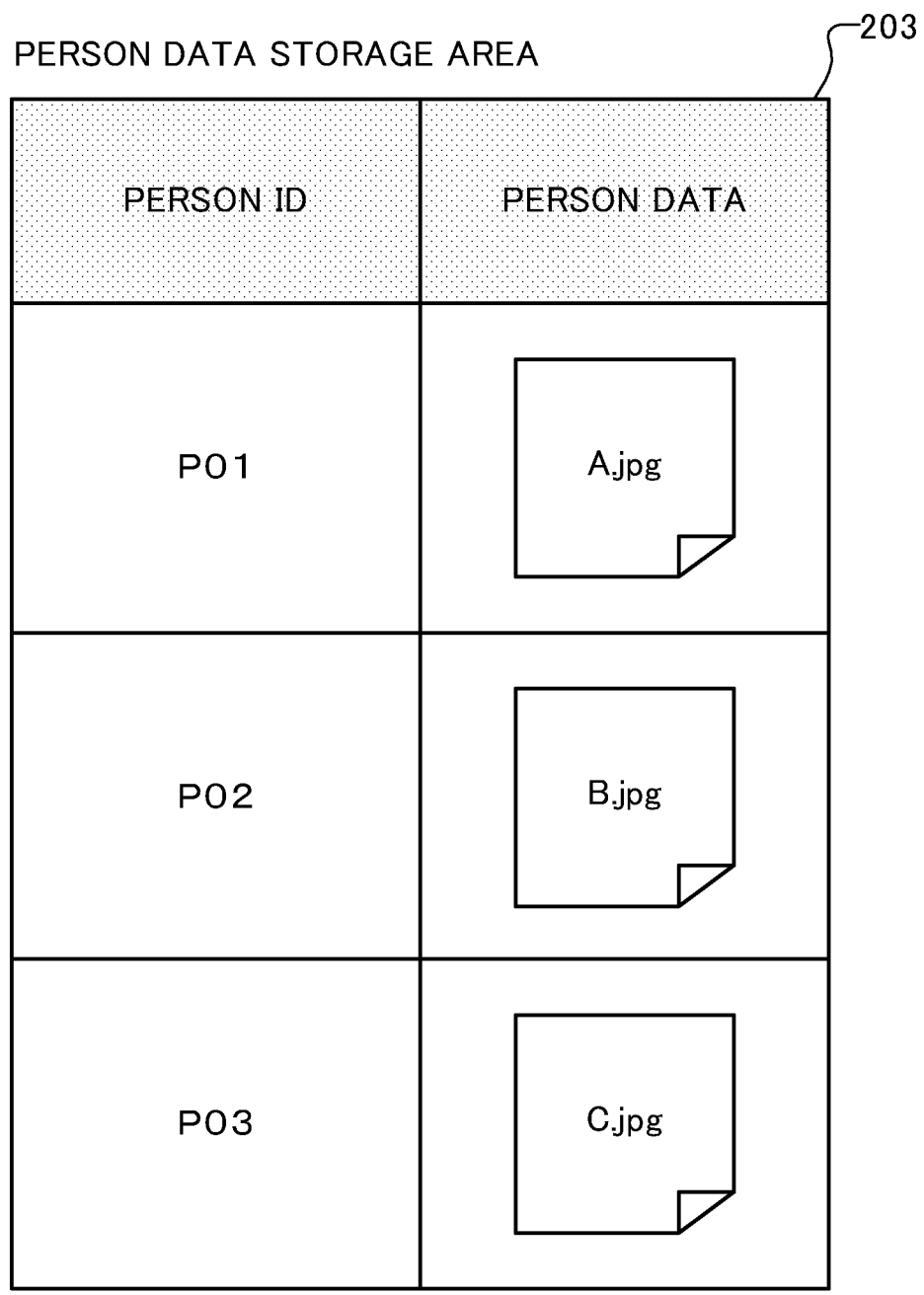
FIG. 5 is a diagram illustrating an example of the data stored in a person data storage area.

The person data storage area 203 stores data (person data) necessary for specifying who the person is, as illustrated in FIG. 5. The person data is mainly a captured face image of the person (a face image). Each of the person data is provided with an ID (a person ID) for uniquely identifying the person data. The person data may be various information characterizing a person (skin color, eyes, a mouth size and the like).

The storage unit 104 stores association information 204. The association information 204 associates an image stored in the image storage area 201, address book data stored in the address book data storage area 202 and person data stored in the person data storage area 203 with one another. An example of the association information 204 is illustrated in FIG. 6. A first entry of the association information 204 illustrated in FIG. 6 shows that an image of an image ID "I01", person data of a person ID "P01" and address book data of an address book ID "A01" are associated with one another. A second entry shows that an image of an image ID "I02" is associated with person data of a person ID "P02", but has not been associated with address book data yet. The example illustrated in FIG. 4 is merely an example so that file names of data may correspond to one another without associating IDs and any configuration of the association information 204 can be adopted.

Since capacity of the storage unit 104 has upper limit, the communication terminal device 1 may be short of capacity. Therefore, the communication terminal device 1 of the present embodiment includes the external memory loading unit 111 and external memory driver 110 to accept an external memory 113 such as a semiconductor memory. The external memory loading unit 111 is installed on side surface of a housing so that the external memory 113 will not drop off while a user is performing operation.

The communication terminal device 1 can read and write images captured by the imaging unit 103 and various information on the external memory 113 loaded in the external memory loading unit 111.

Returning to FIG. 2, the image recognition unit 105 extracts a person's face image from images stored in the image storage area 201. Then, the image recognition unit 105 matches the extracted face image to person data stored in the person data storage area 203, thereby specifying whose face image the face image is.

The audio processing unit 108 performs processing such as compression and expansion for a digital audio signal input to an audio input terminal or output from an audio output terminal.

The multiplexing/demultiplexing unit 109 compresses and expands a picture signal, and multiplexes compressed picture data and compressed audio data to generate stream data for a moving image. The multiplexing/demultiplexing unit 109 also reads stream data from the storage unit 104 and the external memory 113, demultiplexes the stream data into compressed picture data and compressed audio data, and passes the demultiplexed data to audio input/output terminals or the display unit 107.

The communication unit 106 includes an antenna and the like and sends or receives information to/from other information processing devices. The communication unit 106 also sends and receives to/from a base station, a location server or a global positioning system (GPS) satellite and acquires a position coordinate (longitude, latitude) of the communication terminal device 1. The communication unit 106 also performs communication processing and the like so that the communication terminal device 1 can access the Internet. The communication unit 106 may not be a single unit as illustrated in FIG. 2 and a plurality of communication units 106 may be provided so that a plurality of communication methods such as CDMA, EV-DO, wireless LAN and the like can be used.

The audio processing unit 108, multiplexing/demultiplexing unit 109 and external memory driver 110 may realize their functions acting as an hardware in a special circuit or may realize their functions acting as a software available for the control unit to execute a program stored in the storage unit 104.

(Image-Attached-E-mail Sending Processing)

Processing in which a user operates the communication terminal device 1 to create an e-mail with an attached image (an image-attached-e-mail sending processing) will be described with reference to FIG. 7.

First, the user operates the operation unit 101 in the communication terminal device 1 to input an instruction for activating a software to create an e-mail (Mailer). The control unit 102 activates the Mailer in response to the instruction (step S101). Specifically, the user can activate the Mailer by selecting an item such as "e-mail" onto "new document" from a menu screen. The user can also activate the Mailer instantly by pushing down a specified key such as a shortcut key. In this way, various methods can be used to activate the Mailer, and as long as the Mailer can be activated, the present invention can be applied to the present embodiment in any case.

Next, the user instructs the control unit 102 to attach an image to the e-mail created by operating predetermined menu and icons in the Mailer. In response to the instruction, the control unit 102 displays, in a list form, images stored in the image storage area 201 on the display unit 107 so as to be selected by the user and receives a user's selection of an image to be attached to the e-mail (hereinafter referred to as an image to be attached) (step S102). The user selects an attached image that the user wants to attach to the e-mail from the images listed on the screen.

When an image that the user wants to attach to the e-mail is selected by the user, the control unit 102 performs an automatic destination acquisition processing to acquire an e-mail address associated with the selected image to be attached (step S103). The automatic destination acquisition processing will be described in detail later.

If an e-mail address cannot be acquired by the automatic destination acquisition processing (step S104; No), the control unit 102 attaches the image to be attached selected in the step S102 to the e-mail with a setup of the subject, message and destination input by the user thereafter (step S105).

If e-mail addresses can be acquired by the automatic destination acquisition processing (step S104; Yes), the control unit 102 displays the acquired e-mail addresses as destination candidates of the e-mail on the display unit 107 so as to be selected by the user (step S106). The user operates the operation unit 101 to select an e-mail address that the user wants to set as the destination of the e-mail from the displayed destination candidates. Then, the control unit 102 sets the selected e-mail address as the destination of the e-mail (step S107). Next, the control unit 102 attaches the image to be attached selected in step S102 to the e-mail with a setup of the subject, message and destination input by the user thereafter (step S108).

Moreover, when the user instructs such as to push down a button and so on for sending an e-mail, the control unit 102 sends the e-mail with an image created in step S105 or S107 (step S109). With performing the aforementioned, the processing of sending an e-mail with an attached image is terminated.

(Automatic Destination Acquisition Processing)

Figure 8A:
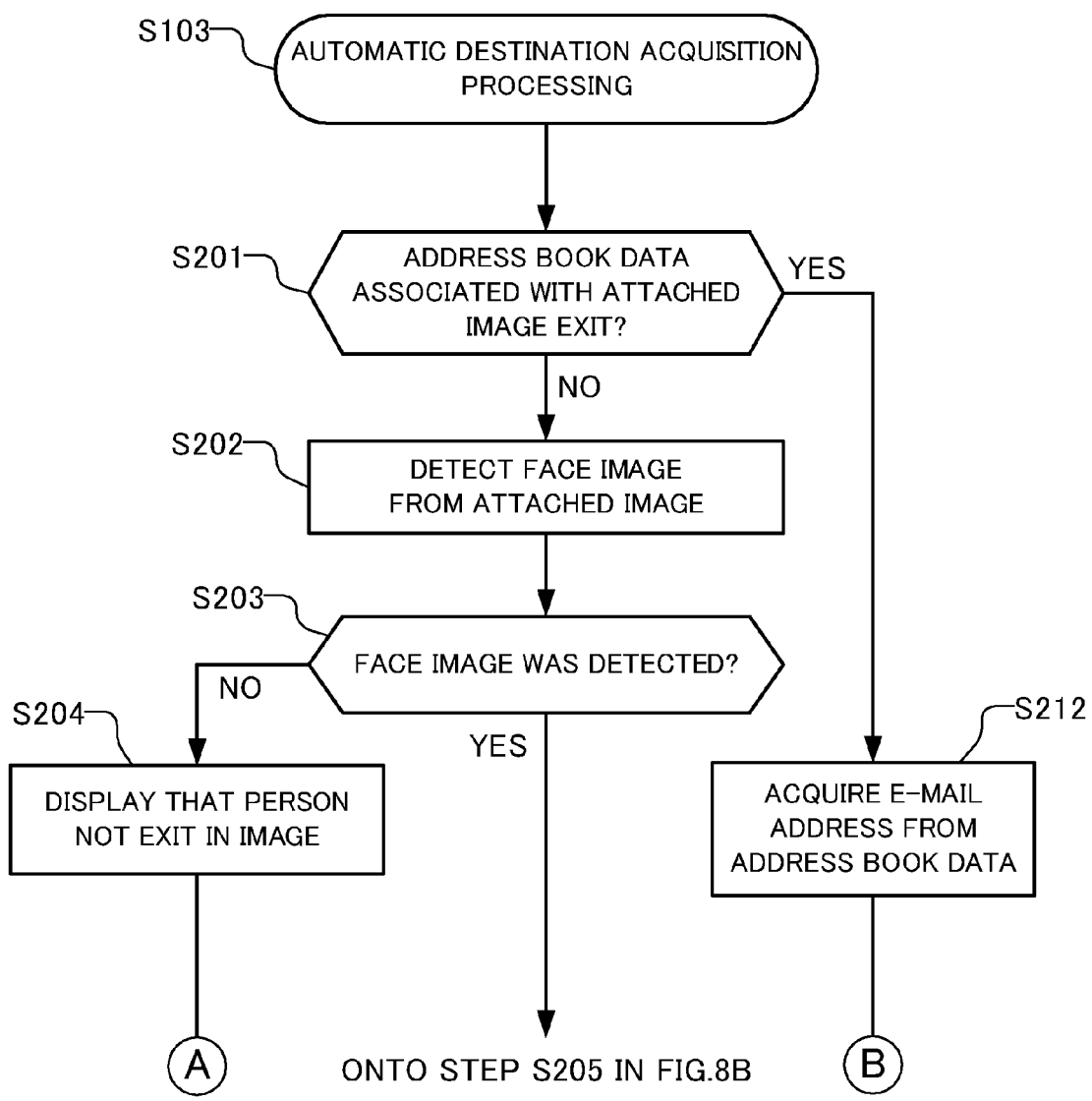
FIGS. 8A and 8B are flow charts of an automatic destination acquisition processing.
Figure 8B:
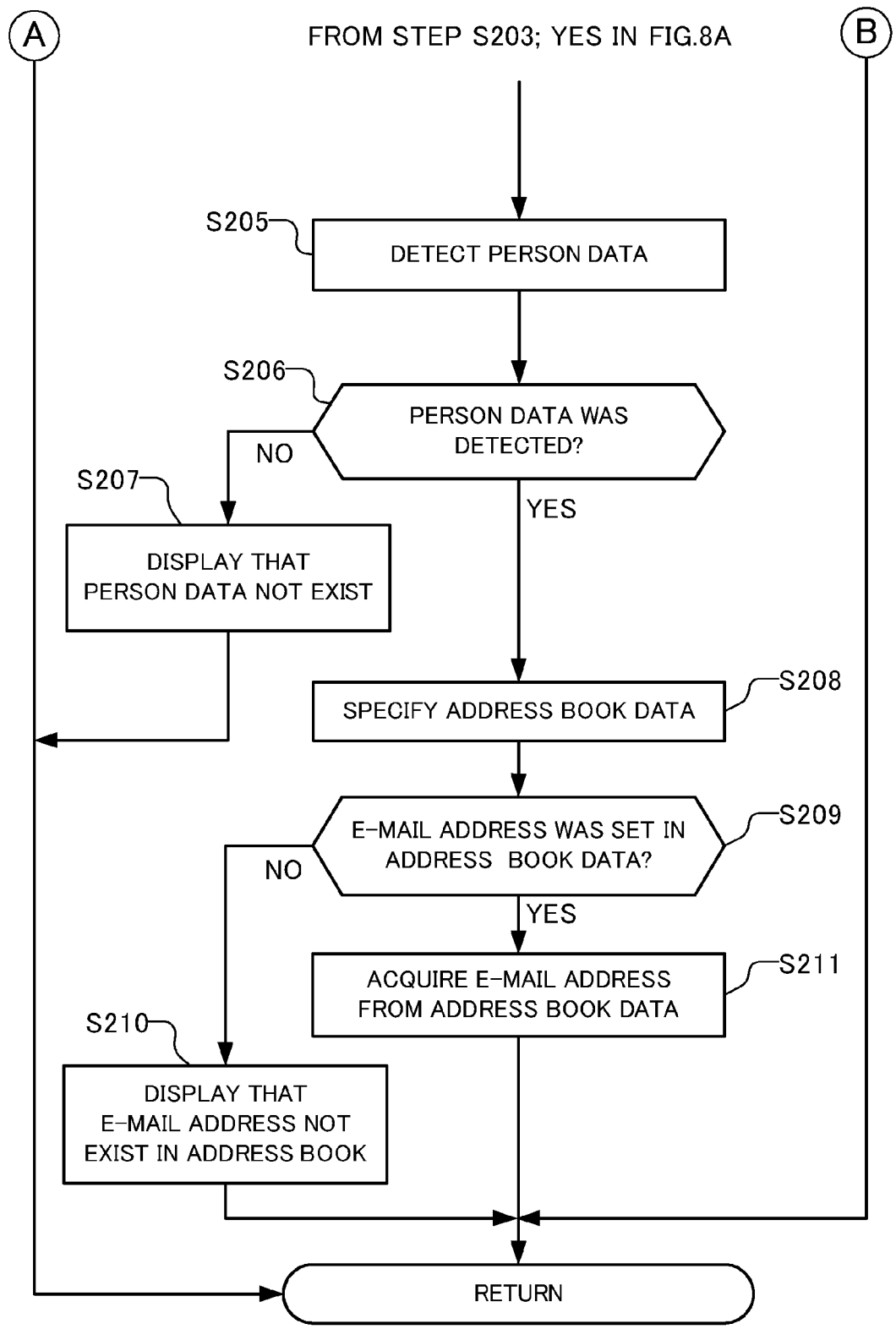

The aforementioned automatic destination acquisition processing (step S103) will be described in detail with reference to a flow chart in FIGS. 8A and 8B.

First, the control unit 102 refers to the association information 204 stored in the storage unit 104 and determines whether address book data associated with the attached image selected in step S102 exists or not (step S201).

If the control unit 102 determines that the associated address book data exists (step S201; Yes), it acquires an e-mail address from the address book data (step S212) and the automatic destination acquisition processing is terminated. In this case, without the aftermentioned processing to analyze an attached image and recognize a face image of an imaged person, the control unit 102 can instantly acquire an e-mail address associated with the attached image by referring to the association information 204.

If the control unit 102 determines that associated address book data does not exist (step S201; No), it controls the image recognition unit 105 to analyze the attached image selected in step S102 and detect a face image of an imaged person from the attached image (step S202). Specifically, the control unit 102 uses a template image of a person's face to perform pattern matching within the attached image, thereby acquiring a face image of the imaged person from the attached image. The control unit 102 may use an image recognition technique other than using the template image to detect a face image from the attached image.

If a face image cannot be detected in the processing of step S202 (step S203; No), it means that a person of an imaged object does not exist within the attached image. Therefore, the control unit 102 displays to notify a message such as "Since a person does not exist in the attached image, a destination cannot be automatically set" on the display unit 107 (step S204). The automatic destination acquisition processing is terminated without acquiring an e-mail address of a destination.

If a face image can be detected in the processing of step S202 (step S203; Yes), the control unit 102 controls the image recognition unit 105 to detect person data of a person matching a person of the detected face image from person data stored in the person data storage area 203 of the storage unit 104, using a predetermined person reference algorithm and the like (step S205).

If the matching person data cannot be detected in the processing of step S205 (step S206; No), it means that person data of the imaged person in the attached image is not stored in the person data storage area 203. Therefore, the control unit 102 displays to notify a message such as "Since a person taken in the image is not known, a destination cannot be automatically set" on the display unit 107 (step S207). Then, the automatic destination acquisition processing is terminated without acquiring an e-mail address for a destination.

After processing of step S207, the user may additionally store, as data of a new person, the face image that has been determined not to have person data matching thereto in the person data storage area 203. This enables the person to be specified from the next time, thereby improving convenience of the communication terminal device 1 with respect to the automatic destination acquisition processing.

If the person data can be detected in the processing in step S205 (step S206; Yes), the control unit 102 refers to the association information 204 stored in the storage unit 104 to specify address book data associated with the detected person data (step S208). Then, the control unit 102 acquires the specified address book data from the address book data storage area 202 of the storage unit 104 and determines whether an e-mail address is set in the acquired address book data or not (step S209).

If an e-mail address is not set in the address book data (step S209; No), the control unit 102 displays to notify a message such as "Since the e-mail address is not registered in the address book, a destination cannot be automatically set" on the display unit 107 (step S210). Then, the automatic destination acquisition processing is terminated without acquiring an e-mail address for a destination.

If it is determined that the e-mail address is set in the address book data (step S209; Yes), the control unit 102 acquires the e-mail address from the address book data (step S211). Then, the automatic destination acquisition processing is terminated. After processing of step S211, association information 204 that associates the address book data from which the e-mail address is acquired, person data detected in step S205, and the image selected by the user in step S102 with one another may be created and stored in the storage unit 104. By doing this, when the image is selected as an attached file from the next time, step S201 determines as Yes due to the existence of the association information 204 and the control unit 102 can instantly acquire the e-mail address from the associated address book data. If a plurality of persons' face images are detected in the processing of step S202, the processing of steps S205 to S211 are performed for each of the face images.

Figure 9A:
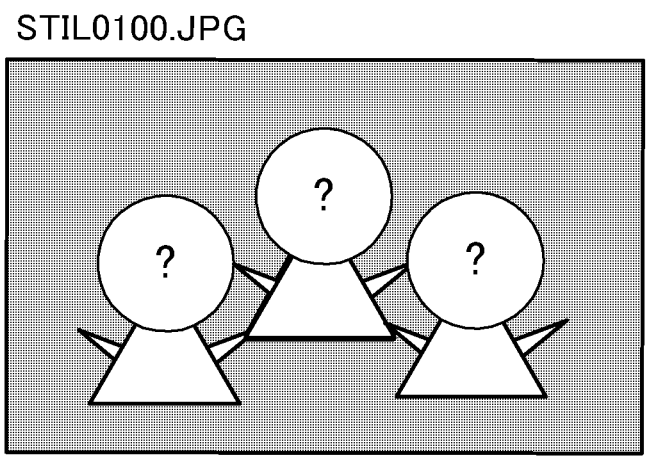
FIGS. 9A to 9C are diagrams specifically illustrating an automatic destination setting processing.
Figure 9B:
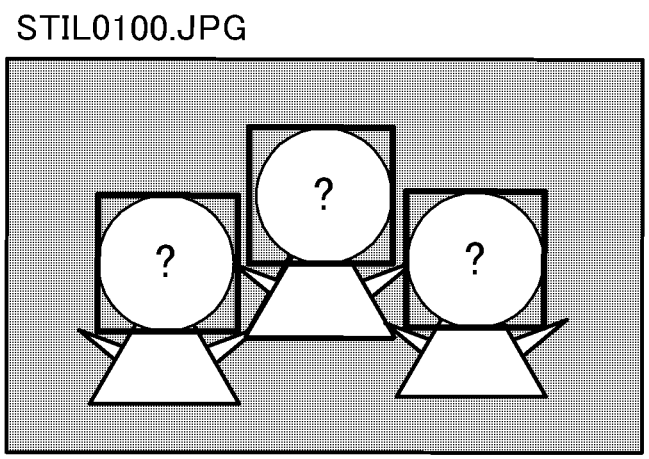
Figure 9C:
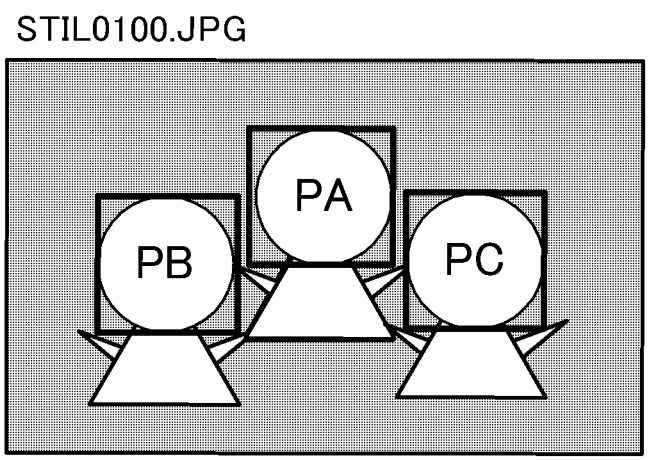

The aforementioned processing will be described with concrete examples with reference to FIGS. 9A to 9C.

For example, the case will be discussed where the user selects an image "STIL0100.JPG" illustrated in FIG. 9A as an attached image in the processing of step S102, and three persons are taken as imaged objects in the attached image. If this image is not registered in the association information 204 (step S201; No), three face images surrounded with thick lines are detected in the processing of step S202, as illustrated in FIG. 9B. Then, in the processing of step S205, each of three face images is compared with person data, and person data of person IDs "PA", "PB" and "PC" are detected as person data corresponding to three persons having the face images, respectively, as illustrated in FIG. 9C.

Furthermore, as illustrated in FIGS. 10A to 10E, address book data of address book IDs "A01", "A02" and "A03" corresponding respectively to person data of person IDs "PA", "PB" and "PC" are specified from the association information 204 (step S208) and e-mail addresses "A@mail.com", "B@mail.com" and "C@mail.com" are acquired from the specified address book data (step S211). Then the acquired e-mail addresses are selectably displayed on the display unit 107 as destination candidates of an e-mail attached with the selected image "STIL0100.JPG" (step S106). Then, an e-mail address selected by the user from the destination candidates ("B@mail.com" in FIG. 10E) is set as a destination of the e-mail with the attached image "STIL0100.JPG" (step S107).

In this way, according to the present embodiment, when the user selects an image to be attached to an e-mail, an image recognition function is performed for the selected image so that the control unit 102 specifies imaged persons in the image, and e-mail addresses of the specified persons are displayed as destination candidates on the display unit 107 so as to be selected by the user. Therefore, the user does not need to search an-email destination from the address book, but needs to select and set a destination from destination candidates, thereby preventing an e-mail from being sent to an unintended destination.

All the more, the present invention is modifiable and applicable.

(Specifying a Destination Candidate While Taking into Consideration an Association Degree with an Attached Image)

In the examples illustrated in FIGS. 9A to 9C and 10A to 10E, the control unit 102 treats e-mail addresses of three imaged persons "A@mail.com", "B@mail.com" and "C@mail.com" equally and selectably displays them as destination candidates on the display unit 107. Alternatively, the control unit 102 may calculate an association degree, which indicates to what extent each of the imaged persons is associated with the attached image, from a predetermined information and displays only person data whose association degree is greater or equal to a predetermined value as an destination candidate on the display unit 107.

Figure 11A:
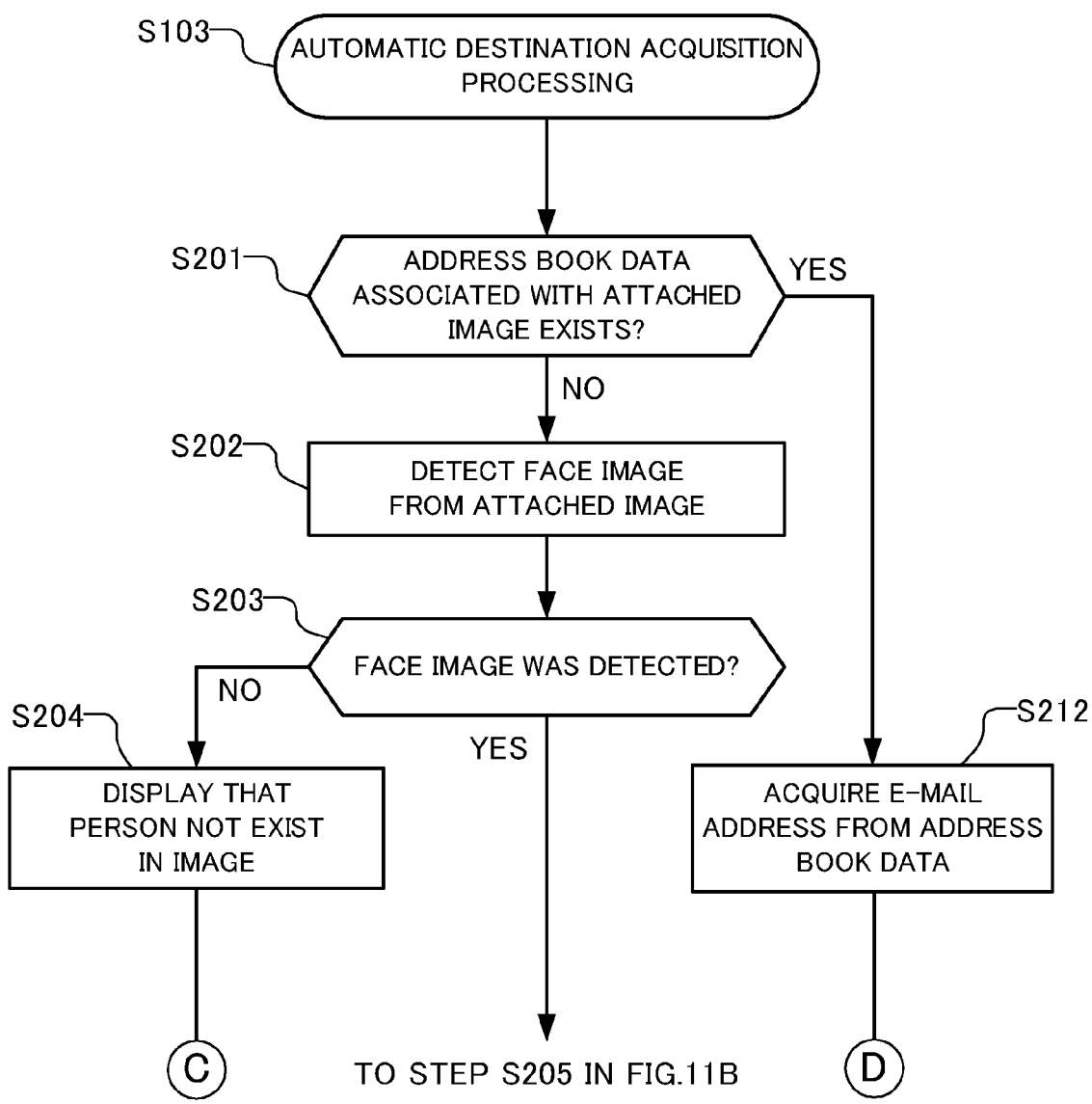
FIGS. 11A and 11B are flow charts of an automatic destination acquisition processing in the case where only persons whose association degrees are greater or equal to a predetermined value are made to be destination candidates.
Figure 11B:
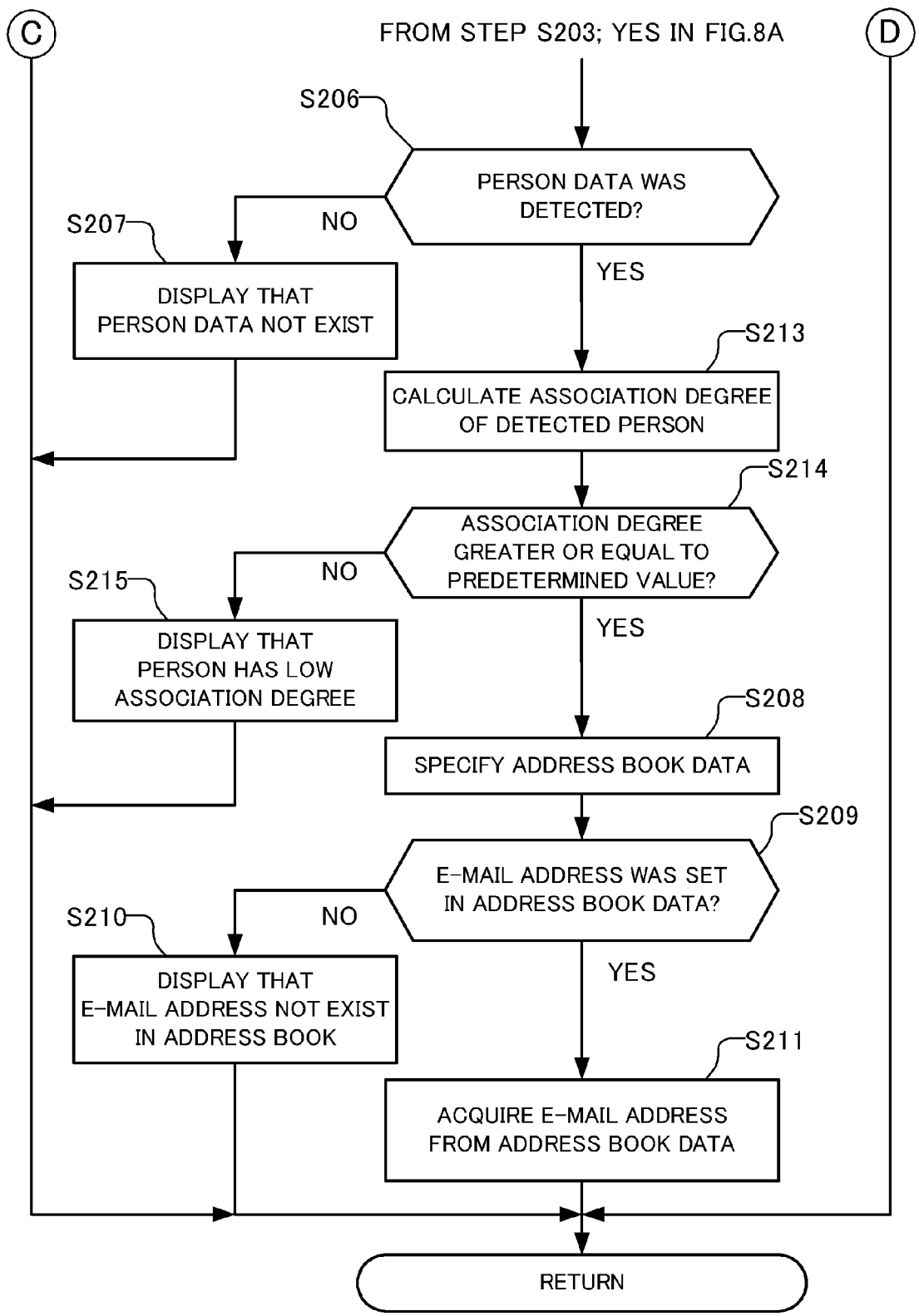

A flow chart of the automatic destination acquisition processing in the case of performing such a control is illustrated in FIGS. 11A and 11B. The description of the same processing as that of the automatic destination acquisition processing illustrated in FIGS. 8A and 8B will be omitted.

If person data can be detected (step S206; Yes), the control unit 201 calculates an association degree between a person of the detected person data and the attached image (step S213). Details on a method of calculating an association degree will be described later.

Then, the control unit 102 determines whether the calculated association degree is greater or equal to a predetermined value or not (step S214).

If it is determined that the association degree is less than a predetermined value (step S214; No), the control unit 102 displays a message such as "Since the detected person is rarely associated with the image, the e-mail address is not set as a destination" on the display unit 107 in order to notify accordingly (step S215).

If it is determined that the association degree is greater or equal to a predetermined value (step S214; Yes), the control unit 102 specifies address book data corresponding to the face image and performs the same processing of acquiring an e-mail address as that described in FIGS. 8A and 8B so that the automatic destination acquisition processing is terminated (steps S208 to S211).

Performing such an automatic destination acquisition processing allows to control for example, to exclude a subject that is estimated to be not so important for the user (low association degree) such as a person showing up small in a corner of the attached image, from a destination candidate, thereby to improve usability of the communication terminal device 1.

Figure 12:
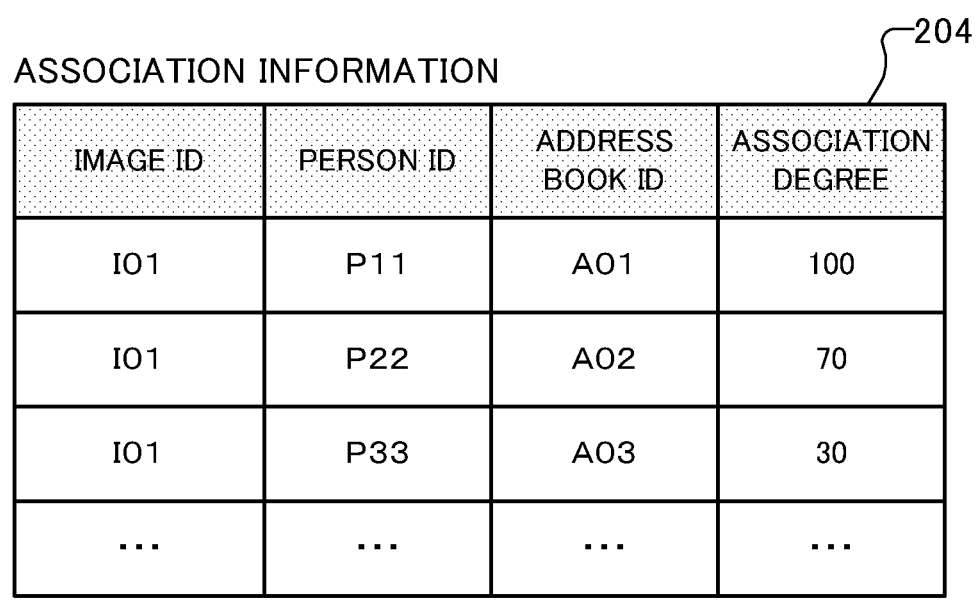
FIG. 12 is a diagram illustrating an example of association information including an association degree and the like to be stored.

As illustrated in FIG. 12, the association information 204 may include the aforementioned association degree. FIG. 12 shows not only that three persons having person ID "P11", "P22" or "P33" respectively are imaged objects in an image ID "I01", but also that the person with person ID "P11" is most associated with the image among the three persons. Instead of storing association degrees indicated by numeric values as illustrated in FIG. 12, association degrees indicated by "great", "intermediate", "little" and the like may be stored.

In this way, if the association information 204 includes an association degree, the control unit 102 may refer to the association information 204 to specify address book data whose association degree with the attached image is greater or equal to a predetermined value and acquire its e-mail address.

If a plurality of imaged persons (person data) are detected from one attached image, the control unit 102 may calculate an association degree of each of the imaged persons or acquire from the association information 204, rank each of the imaged persons according to his/her association degree, and display destination candidates with their e-mail addresses on the display unit 107 so as to be selected by the user. In FIGS. 13B and 13C, e-mail addresses of three imaged persons such as "A@mail.com", "B@mail.com" and "C@mail.com" are ranked with the first to third place and destination candidates are displayed so as to be selected by the user. Displaying as aforementioned enables the user to select an e-mail address that the user wants to send by reference to the ranks, thereby to improve usability of the communication terminal device 1.

Next, examples of methods A to D for finding the aforementioned association degree will be described below. These methods are mere examples, the average value of the values calculated with the respective methods may be an association degree, or other methods other than these methods may be used to find an association degree.

(A) Finding an Association Degree, Based on a Position of a Face Image Within an Image The control unit 102 determines a position of a face image of an imaged person detected in step S202 of the automatic destination acquisition processing and provides a higher association degree for a determined position as closer to the center of the attached image.

Figure 13A:
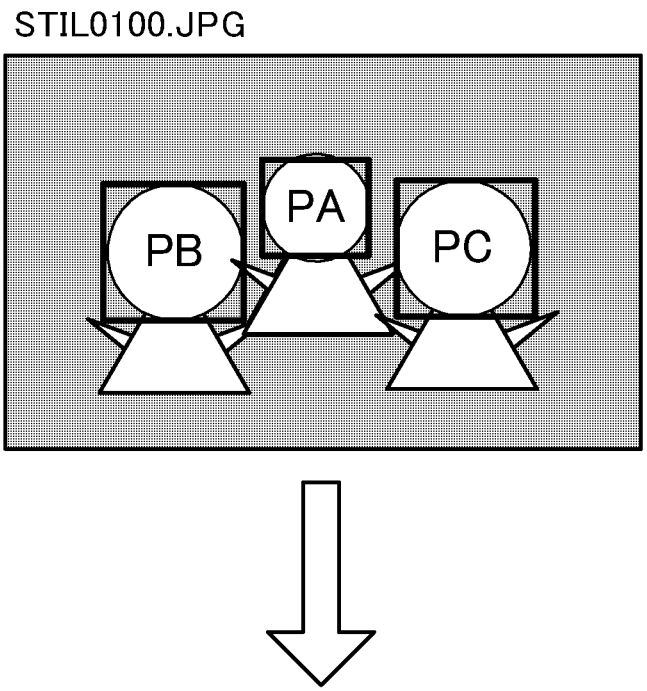
Figure 13B:
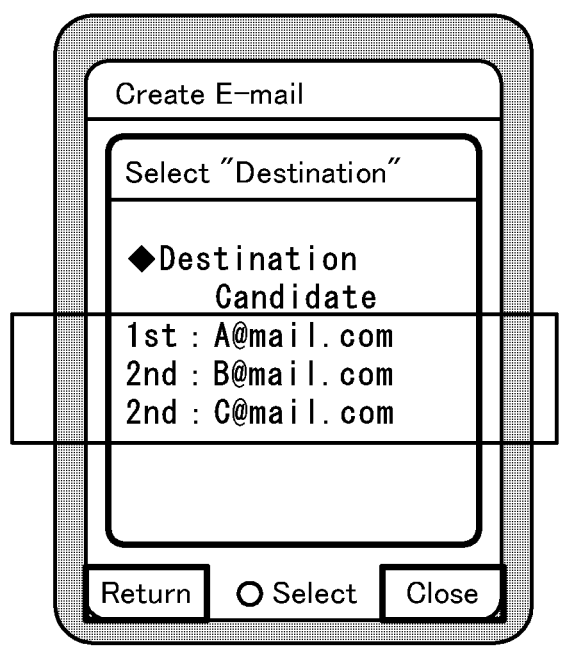

For example, in the case where an association degree is found for an image of FIG. 13A, "STIL0100.JPG" with this method and each imaged person is ranked, an e-mail address of a centered person with person ID "PA" such as. "A@mail.com" is ranked as the first destination candidates, e-mail addresses of persons positioned at either side of the centered person with person IDs "PA" and "PB" such as "B@mail.com" and "C@mail.com" are equally ranked and displayed as the second (FIG. 13B).

(B) Finding an Association Degree, Based on a Size of a Face Image

The control unit 102 determines a size of the face image detected in step S202 of the automatic destination acquisition processing and provides an imaged person with a bigger face image with a higher association degree.

For example, in the case where an association degree is found for an image of FIG. 13A, "STIL0100.JPG" with this method and each imaged person is ranked, e-mail addresses of persons with person IDs "PB" and "PC" whose face images are the biggest such as "B@mail.com" and "C@mail.com" are ranked and displayed as the first destination candidate and an e-mail address of a person with person ID "PA" such as "A@mail.com" is ranked and displayed as the third (FIG. 13C).

(C) Finding an Association Degree, Based on an E-mail Sending/Receiving History

The control unit 102 may find an association degree of an imaged person on the basis of an e-mail sending/receiving history if the e-mail sending/receiving history is stored in the storage unit 104. For example, the control unit 102 refers to the sending/receiving history thereby to provide a higher association degree to an imaged person with more number of times of sending and receiving e-mails. Alternatively, the control unit 102 refers to the sending/receiving history thereby to provide a higher association degree to an imaged person with more number of times of sending/receiving e-mails with attached images.

(D) An Association Degree in the Case of a Moving Image

Figure 14:
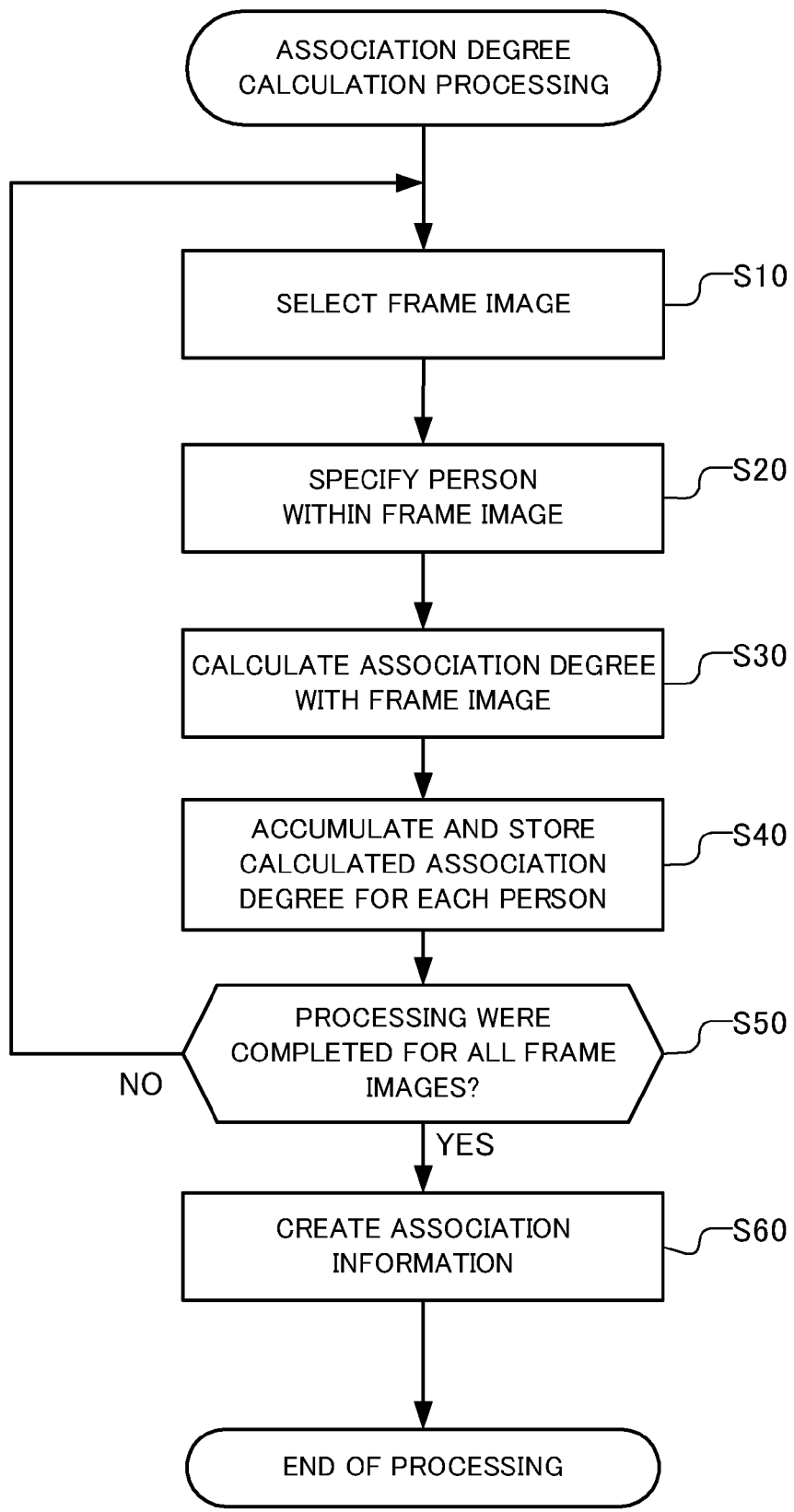
FIG. 14 is a flow chart of a calculating processing of an association degree from a moving image.

The aforementioned methods A to C for calculating an association degree are mainly applied for an imaged person detected from a still image. For example, an association calculation processing for finding an association degree of each person within a moving image A from the moving image A will be described with reference to a flow chart in FIG. 14.

First, the control unit 102 selects one frame image from frame images composing the moving image A (step S10). Next, the control unit 102 uses person data stored in the person data storage area 202 to specify a person (a face image) within the selected frame image (step S20). In doing this, the control unit 102 also acquires the person ID of this person (face image) from person data stored in the person data storage area 202.

Moreover, the control unit 102 finds an association degree that indicates to what extent the specified person (face image) is associated with the frame image (step S30). For example, the control unit 102 determines the position and size of the detected face image within the frame image. Then, the control unit 102 substitutes the determination result into a predetermined expression for calculating an association degree, thereby finding the association degree, the expression being constituted such that a higher association degree is provided to a person whose face image is positioned closer to the center of the frame image and has bigger size. Then, the control unit 102 accumulates and stores the found association degree for each person ID of the detected person (face image) in the storage unit 104 (step S40).

If there remains an frame image for which the aforementioned steps S10 to S40 have not yet been performed processing among the frame images composing the moving image A (step S50; No), the control unit 102 repeatedly performs processing of selecting the frame image (step S10), detecting a person within the frame image (step S20), calculating an association degree of the detected person (step S30), and accumulating and storing the association degree for each person (step S40).

If aforementioned processing in steps S10 to S40 have been performed in all frame images composing the moving image A (step S50; Yes), the association degree accumulated and stored for each person in the step S40 becomes an association degree for each person within the moving image A. Therefore, the control unit 102 creates the association information 204 in which the association degree for each person (person ID) stored in step S40 corresponds to an image ID of the moving image A (step S60). With performing the aforementioned, processing for calculating an association degree in a moving image is terminated. In this processing, a higher association degree is calculated for a person who is imaged a lot in the frame images composing a moving image and is imaged bigger in the center of the images.

(Specifying Destination with the Use of an AE/AF Control History)

When the imaging unit 103 captures an image of a person, an auto exposure (AE)/auto finder (AF) control can be performed for the face of the person. For example, a person (a person ID) to give the AE/AF control preferentially is previously registered before imaging, and if a face image of the person is recognized during capturing an image, the control unit 102 automatically adjusts exposure time and focus (AE/

AF control) such that the recognized face image can be captured most beautifully. In doing this, the control record can be recorded as the AE/AF control history as illustrated in FIGS. 15A and 15B. FIG. 15A illustrates one example of AE/AF control history information in capturing a still image, in which a still image is associated with person ID of a person given to the AE/AF control in the still image. For example, the AE/AF control history in FIG. 15A shows that AE/AF control was performed such that persons with person IDs "PA" and "PB" are beautifully imaged in a still image "STIL0999.JPG". In other words, persons with person IDs "PA" and "PB" are considered to be main imaged persons in the still image "STIL0999.JPG". Therefore, if the user selects "STIL0999.JPG" as an image to be attached to an e-mail and to be sent, the control unit 102 can display e-mail addresses of persons with person IDs "PA" and "PB" as destination candidates on the display unit 107 so as to be selected by the user, by referring to the AE/AF control history information. Therefore, the communication terminal device 1 can display an e-mail address as a destination candidate from a still image with the consideration of an AE/AF control history, thereby further improving usability of communication terminal device 1.

FIG. 15B illustrates one example of AE/AF control history information in capturing a moving image. The AE/AF control history information illustrated in FIG. 15B shows that persons with person IDs "PA" and "PI" were given AE/AF control in a moving image "MOVE0001.m2ts". Time required for adjusting exposure time and a focus (AE operation time, AF operation time, respectively) shows that AE/AF control was performed for the person with person ID "PA" more often than for the person with person ID "PI". Therefore, when the user selects "MOVE0001.m2ts" as an image to be attached to an e-mail, the control unit 102, by referring to the AE/AF control history information, can set e-mail addresses of the two persons with person IDs "PA" and "PI" given AE/AF control as destinations and also can display the e-mail address of the person with person ID "PA" as the first potential destination candidate and the e-mail address of the person with person ID "PI" as the second potential candidate on the display unit 107.

In this way, the communication terminal device 1 according to the present embodiment, can display an e-mail address in a moving image as destination candidate with the consideration of an AE/AF control history, thereby further improving usability of the communication terminal device 1.

Examples have been described in which determination is made using AE/AF control history information, but the same advantageous effect can be obtained by using other information as long as it can be determined which person was mainly imaged.

(Example in which an Image is not Sent to the User Himself/Herself)

When the user selects an image to be attached to an e-mail and uses an image recognition function for the selected image, there may be a case where the user himself/herself is recognized. Such a case includes, for example, a case where an image of the user and A with their arms around each other is captured by the user himself/herself using his/her own mobile phone, and then the image is selected. In this case, necessity to send this image to the user himself/herself is remarkably low. Therefore, if the user and A are recognized in the image attached by the user, control may be performed so as to exclude an e-mail address of the user from destination candidates or to put it in a lower rank of destination candidates. The user's own e-mail address may be displayed as a destination candidate and a warning message may be displayed at the same time.

(Example for Acquiring and Setting an E-Mail Address from an Image in which an Imaged Object is not a Person)

Figure 16:
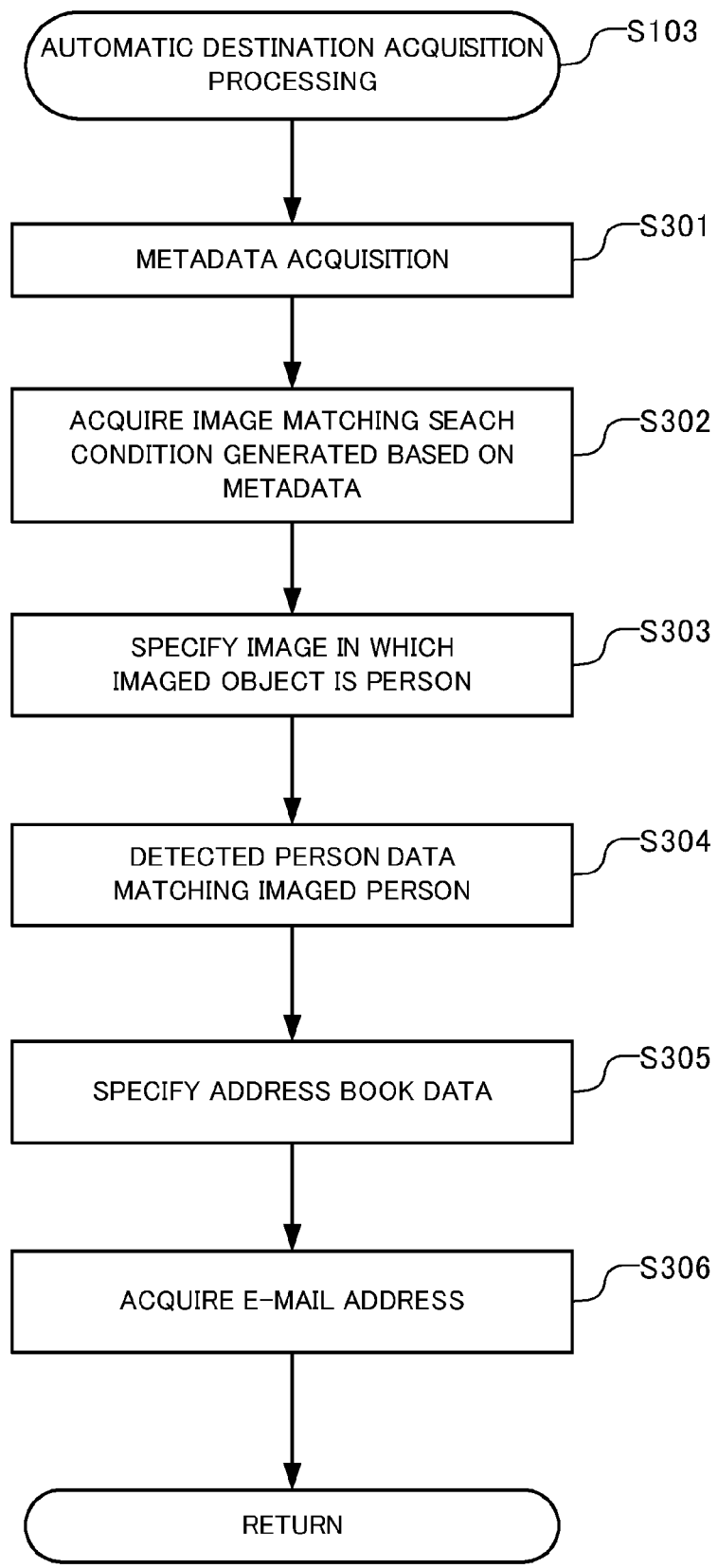
FIG. 16 is a flow chart of an automatic destination acquisition processing in the case where an e-mail address is acquired from an image whose imaged object is not a person.

In the aforementioned embodiments, in order to acquire an e-mail address from an attached image, the attached image needs to include a person as an imaged object. However, the control unit 102 can acquire an e-mail address from an image in which only a landscape was imaged and no person can be detected, by using metadata contained in the attached image. The automatic destination acquisition processing in this case will be described with reference to a flow chart in FIG. 16.

First, the control unit 102 acquires metadata from an attached image selected by the user (step S301). In this case, the imaging date, time and place of the attached image are acquired as metadata. The control unit 102 may acquire metadata from a header file area of the attached image, or if metadata is stored in for example the storage unit 104, the control unit 102 may acquire metadata from the storage unit 104.

Next, with the use of search conditions generated on the basis of the acquired metadata, the control unit 102 searches images stored in the image storage area 201 of the storage area 104 and acquires the images matching the search conditions (step S302). Examples of the search conditions based on metadata include "search images captured within three days after the day when the attached image was captured", "search images captured on a place within a predetermined distance from the place where the attached image was captured" and "search images captured on the same day and on the time within one hour before or after the time when the attached image was captured". With the use of such search conditions, the control unit 102 can search metadata of images stored in the image storage area 201 to acquire images matching the search conditions.

Next, the control unit 102 controls the image recognition unit 105 to specify images in which an imaged object is a person among the images matching search conditions acquired in step S302 (step S303). Specifically, the control unit 102 may use a template image of a person's face to perform pattern matching within each of the images acquired in step S302, thereby specifying an image in which the person's face image is detected.

Next, the control unit 102 controls the image recognition unit 105 to detect person data of a person matching an imaged person within the image specified in step S303 in the person data storage area 203 of the storage unit 104, using a predetermined person reference algorithm and the like (step S304).

In the following, the control unit 102 refers to the association information 204 to specify address book data associated with the detected person data and acquire it from the address book data storage area 202 (step S305). Then, the control unit 102 acquires an e-mail address from the acquired address book data (step S306). With performing the aforementioned, the automatic destination acquisition processing is terminated. Then, the control unit 102 can display on the display unit 107 the acquired e-mail address as a destination candidate of an e-mail with the attached image in which a face image was not detected.

In this way, the control unit 102 can acquire an e-mail address from an image of a landscape and the like in which a person as an imaged object cannot be detected, thereby further improving convenience of the communication terminal device 1.

For example, there is a case where A and B took a trip, A captured a landscape image during a trip, B did not, and A wants to send an e-mail with the landscape image to B. In this case, an image captured on the same time and place and having B as an imaged person can be searched from this landscape image metadata and an e-mail address of B can be specified from the searched image.

(Example of Acquiring an Attached Image from an E-mail Address)

In the aforementioned embodiments, when the user selects an image to be attached to an e-mail, the control unit 102 uses an image recognition function to specify an imaged person included in the image and displays an e-mail address of the specified person as a destination candidate on the display unit 107 so as to be selected by the user. Alternatively, when the user inputs a destination e-mail address, an image in which a person of the destination e-mail address was imaged is detected and displayed as an image candidate to be attached to an e-mail, which also improves convenience of the communication terminal device 1.

Figure 17:
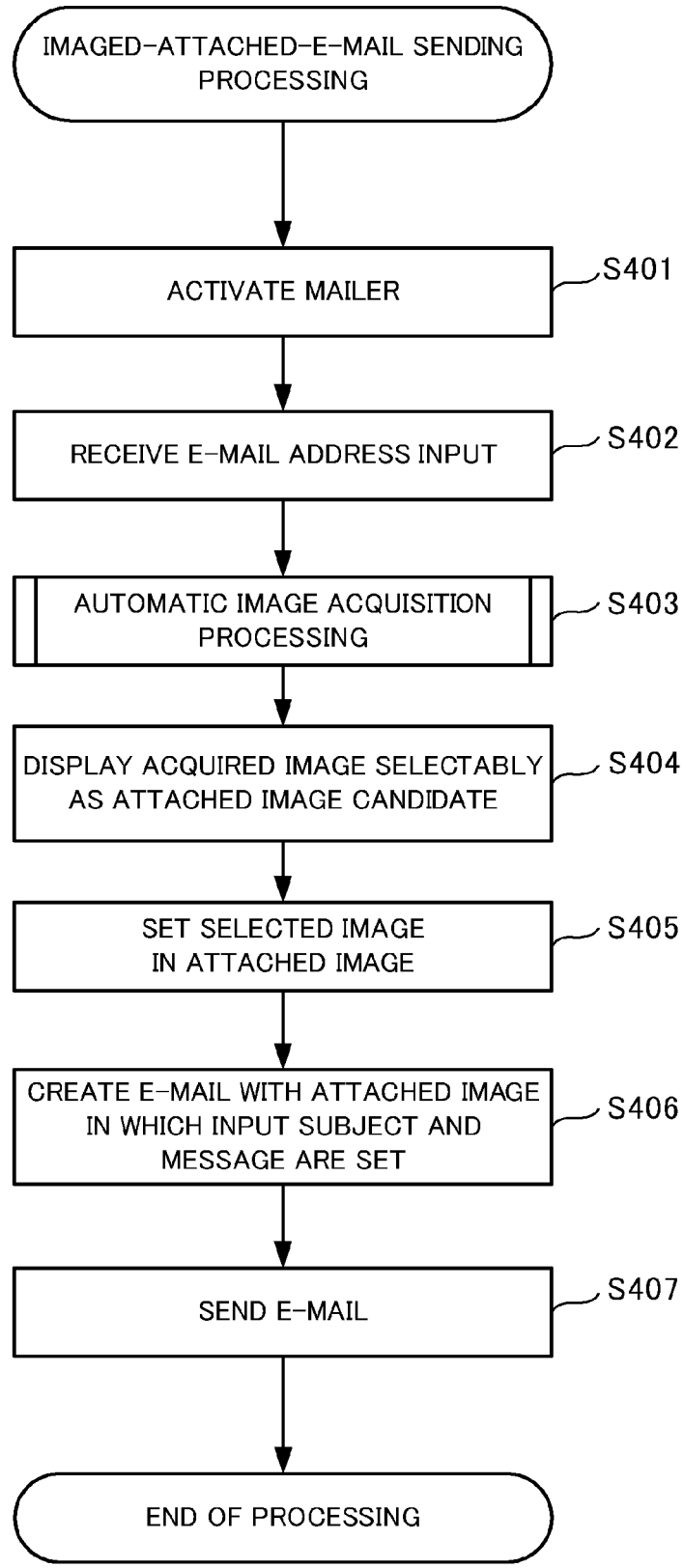
FIG. 17 is a flow chart of a sending processing of an e-mail with an attached image.

Processing for sending an e-mail with an attached image in this case will be described with reference to a flow chart in FIG. 17.

First, the user operates the operation unit 101 to input an instruction for activating Mailer, and the control unit 102 activates the Mailer (step S401). Then, the user operates a menu of the Mailer to instruct an e-mail creation and the control unit 102 receives input of a destination e-mail address (step S402).

When a destination e-mail address is input, the control unit 102 performs an automatic image acquisition processing to acquire images associated with the input e-mail address (step S403). The automatic image acquisition processing will be described later. Instead of inputting an e-mail address, address book data may be designated.

Next, the control unit 102 displays the images acquired in step S403 as image candidates to be attached to an e-mail destined for the e-mail address input in step S402 on the display unit 107 (step S404). The user operates the operation unit 101 to select an image that the user wants to attach to the e-mail from the displayed attached image candidates. Then, the control unit 102 sets the selected image to an image attached to the e-mail (step S405).

Next, the control unit 102 creates an e-mail to which the subject and message input by the user after step S405 are set (step S406) and sent the e-mail (step S407).

(Automatic Image Acquisition Processing)

Figure 18:
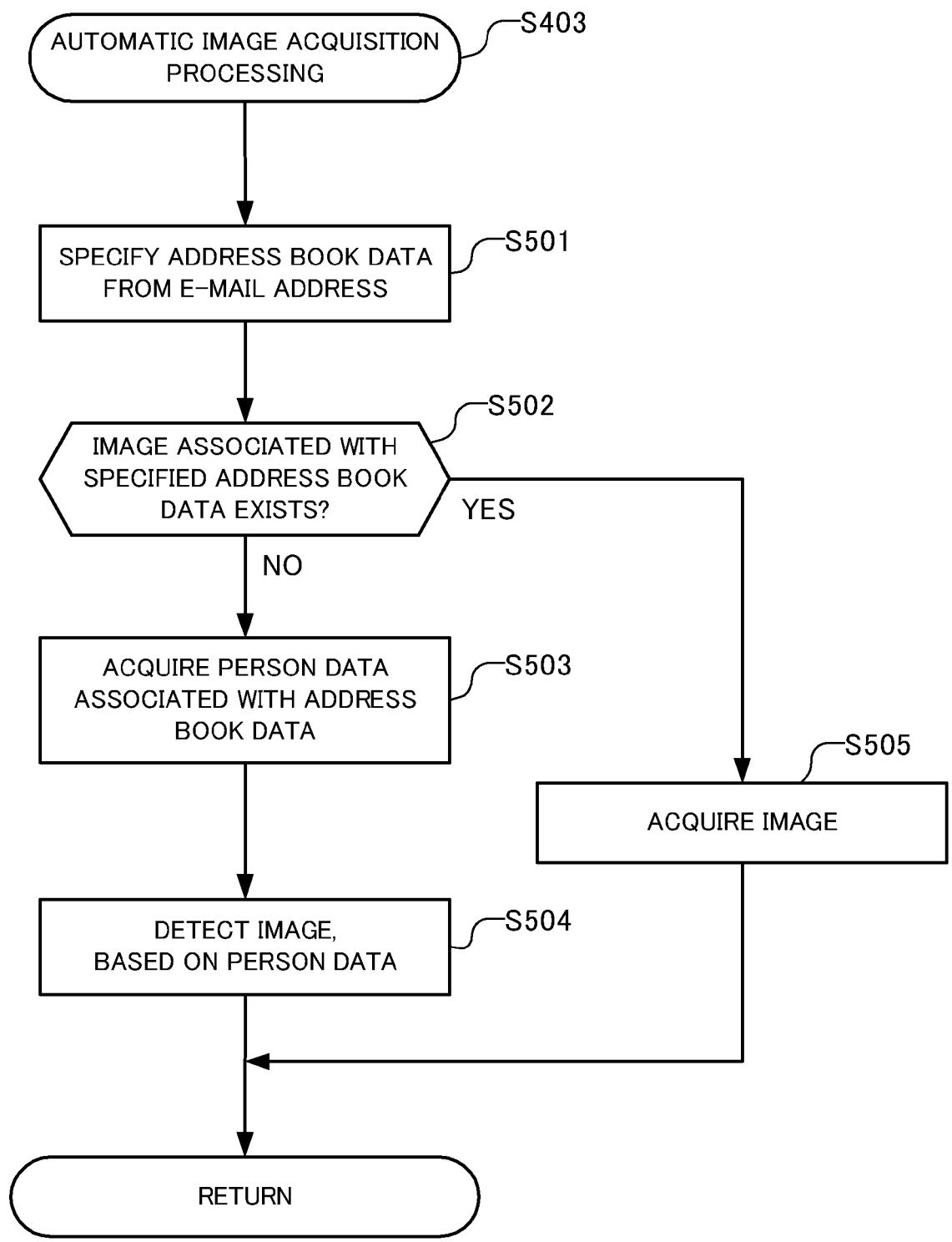
FIG. 18 is a flow chart of an automatic image acquisition processing.
Figures 19A, 19B:
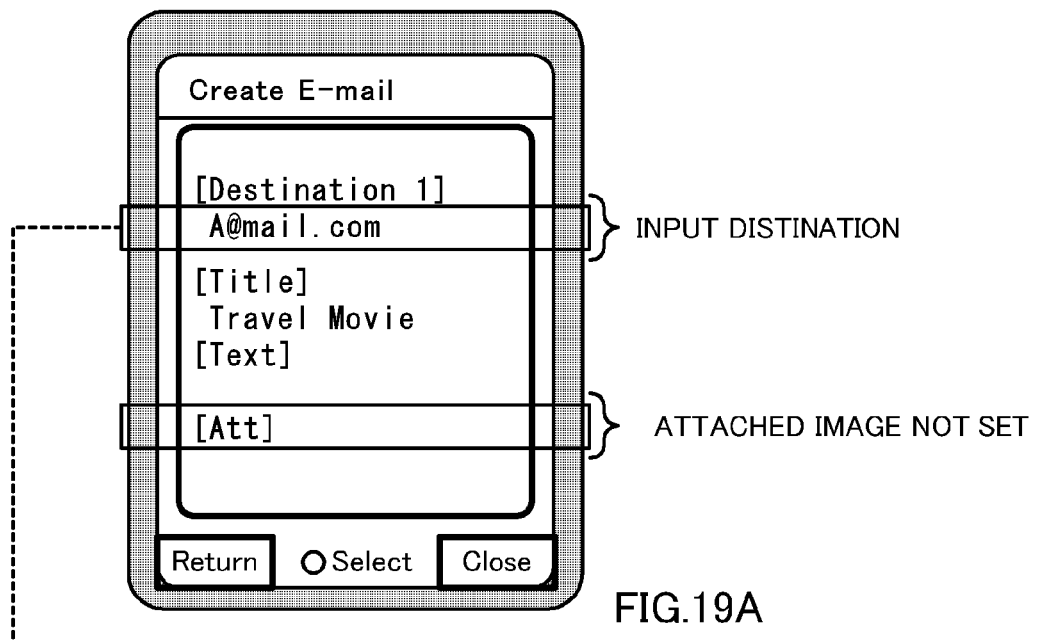

Furthermore, the aforementioned automatic image acquisition processing (step S403) will be described in detail with reference to a flow chart in FIG. 18. In the flow chart of FIG. 18, processing steps to be performed if an image can not be acquired in the automatic image acquisition processing will be omitted in order to make explanation easier.

First, the control unit 102 specifies address book data to which the e-mail address input in step S402 is set from the address book data storage area 202 of the storage unit 104 (step S501).

Next, the control unit 102 refers to the association information 204 stored in the storage unit 104 to determine whether an image associated with the address book data specified in step S501 exists or not (step S502).

If the control unit 102 determines that an associated image exists (step S502; Yes), the control unit 102 acquires the image (step S505) and the automatic image acquisition processing is terminated. In this case, the control unit 102 can instantly acquire an image associated with an e-mail address by referring to the association information 204 without performing the afterementioned processing for searching an image with person data associated with address book data.

If the control unit 102 determines that an associated image does not exist (step S502; No), the control unit 102 refers to the association information 204 to acquire person data associated with the address book data specified in step S501 (step S503).

Next, the control unit 102 controls the image recognition unit 105 to acquire an image in which a person specified by the acquired person data is an imaged object from the images stored in the image storage area 201 with the use of a predetermined person reference algorithm and the like (step S504). With performing the aforementioned, the automatic image acquisition processing is terminated.

After processing of step S504, the association information 204 in which the acquired image, person data detected in step S503, and address book data specified in step S501 correspond to one another may be created and stored in the storage unit 104. By doing this, when an e-mail address included in the address book data is selected from the next time, step S502 determines Yes due to the existence of the association information 204, thereby enabling the control unit 102 instantly to acquire an associated image.

The aforementioned processing will be specifically described with reference to FIGS. 19A to 19E.

For example, when the user inputs an e-mail address "A@mail.com" as a destination of an e-mail (step S402), address book data with address book ID "A01" having the e-mail address is specified (step S501). The control unit 102 refers to the association information 204 to acquire an image associated with this address book ID data "MOVE001.m2ts" (step S505). Then, image candidates to be attached to the e-mail including an image "MOVE001.m2ts" are displayed on the display unit 107 so as to be selected by the user (step S404). An image ("MOVE001.m2ts" in FIG. 19E) the user selected from the attached image candidates is set as a file to be attached to the e-mail having the user's input destination "A@mail.com" (step S405).

When the user inputs a destination e-mail address, images corresponding to the e-mail addresses are specified and displayed as image candidates to be attached to the e-mail on the display unit 107 so as to be selected by the user. Therefore, the user does not need to search an image to be attached, but needs to select and set the image to be attached from image candidates, thereby preventing an unintended image from attaching to an e-mail.

In FIG. 19D, two attached image candidates "MOVE001.m2ts" and "MOVE002.m2ts" are treated equally and displayed as image candidates to be attached. Alternatively, the control unit 102 may calculate an association degree indicating to what extent each image is associated with an imaged object from a predetermined information (the position and size of the imaged object, the display time for a moving image and the like) and avoid setting an image with an association degree less than a predetermined value as an image to be attached to an e-mail or displaying them as image candidates to be attached.

This allows to exclude an image that is estimated to be not important for a destination person such as an image in which a destination person shows up small in a corner of the image from image candidates to be attached, thereby further improving usability of the communication terminal device 1.

Figures 20A, 20B:
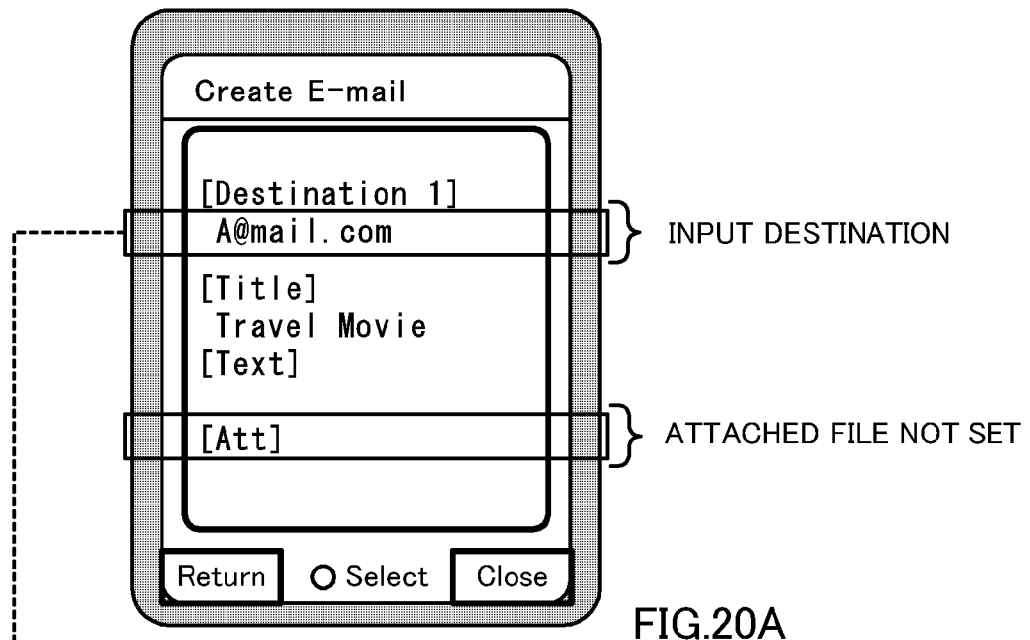

Alternatively, when a plurality of images are detected in the automatic image acquisition processing, the control unit 102 may calculate an association degree of each imaged person or acquire the association degree it from the association information 204, to rank each image according to the association degree and display the images as image candidates to be attached on the display unit 107 so as to be selected by the user. In FIG. 20C, two moving images "MOVE001.m2ts" and "MOVE002.m2ts" are ranked according to their association degrees, and the moving image "MOVE001.m2ts" ranked as the first and the moving image "MOVE002.m2ts" ranked as the second are displayed as image candidates to be attached so as to be selected by the user. This display enables the user to refer to the ranks and select an image that the user wants to attach, thereby further improving usability of the communication terminal device 1.

(Others)

A communication terminal device according to the present invention is not limited to a dedicated hardware and can be realized in a common computer system. Specifically, in the aforementioned embodiments, description has been made with respect to the case where a program of the communication terminal device is previously stored in the storage unit 104. However, the communication terminal device may be configured such that a program for making the aforementioned processing operation function is stored and distributed in a computer readable medium such as an external memory 113, a flexible disc, a compact disk read-only memory (CD-ROM), a digital versatile disk (DVD) and a magneto-optical disk (MO), and by installing the program in a computer the aforementioned processing is performed.

A program may be stored in a disc device of a server device on a communication network such as the Internet, and the program may be downloaded onto a computer by being superimposed on a carrier wave. The aforementioned processing can be achieved by transferring a program via a communication network and activating and executing the program.

In the case where a part of the aforementioned function is performed by an operating system (OS) or the aforementioned function is realized by working an OS and an application together, a program other than OS may be stored and distributed in a medium and downloaded onto a computer.

Having described and illustrated the principles of this application by reference to one or more preferred embodiments, it should be apparent that the preferred embodiments may be modified in arrangement and detail without departing from the principles disclosed herein and that it is intended that the application be construed as including all such modifications and variations insofar as they come within the spirit and scope of the subject matter disclosed herein.

What is claimed is:

1. A communication terminal device comprising:
an image storage unit to store images;
an e-mail address storage unit to store persons' e-mail addresses;
an attached image selection unit to receive a user's selection of an image to be attached to an e-mail from the images stored in the image storage unit;
an imaged object detection unit to detect information that specifies at least one imaged person in the attached image selected by the attached image selection unit;
an e-mail address acquisition unit to acquire e-mail addresses of the imaged person from the e-mail addresses stored in the e-mail address storage unit, on the basis of the information detected by the imaged object detection unit;
a display unit to display the e-mail addresses acquired by the e-mail address acquisition unit as destination candidates of the e-mail with the attached image so as to be selected by the user;
an e-mail address setting unit to set an e-mail address selected by the user from the e-mail addresses selectably displayed by the display unit as a destination of the e-mail with the attached image; and
an association degree calculation unit to find an association degree indicating to what extent the imaged person specified by the information detected by the imaged object detection unit is associated with the attached image,
wherein if a plurality of e-mail addresses are acquired by the e-mail address acquisition unit, the display unit displays each e-mail address as well as information indicating a rank of the each e-mail address as an e-mail destination candidate among the plurality of e-mail addresses, the rank corresponding to the association degree calculated by the association degree calculation unit.

2. A recording medium storing program, the program making a computer function as:
an image storage unit to store images;
an e-mail address storage unit to store persons' e-mail addresses;
an attached image selection unit to receive a user's selection of an image to be attached to an e-mail from the images stored in the image storage unit;
an imaged object detection unit to detect information that specifies at least one imaged person in the attached image selected by the attached image selection unit;
an e-mail address acquisition unit to acquire e-mail addresses of the imaged person from the e-mail addresses stored in the e-mail address storage unit, on a basis of the information detected by the imaged object detection unit;
a display unit to display the e-mail addresses acquired by the e-mail address acquisition unit as destination candidates of the e-mail with the attached image so as to be selected by the user;
an e-mail address setting unit to set an e-mail address selected by the user from the e-mail addresses selectably displayed by the display unit as a destination of the e-mail with the attached image; and
an association degree calculation unit to find an association degree indicating to what extent the imaged person specified by the information detected by the imaged object detection unit is associated with the attached image,
wherein if a plurality of e-mail addresses are acquired by the e-mail address acquisition unit, the display unit displays each e-mail address as well as information indicating a rank of the each e-mail address as an e-mail destination candidate among the plurality of e-mail addresses, the rank corresponding to the association degree calculated by the association degree calculation unit.

3. A communication device comprising:
an image storage device including at least one memory;
an e-mail address storage device for storing persons' e mail addresses;
a processing unit executing program to control:
an attached image selection device for receiving a user's selection of an image to be attached to an e-mail from the images stored in the image storage device;
an imaged object detection device for detecting information that specifies at least one imaged person in the attached image selected by the attached image selection device;
an e-mail address acquisition device for acquiring e-mail addresses of the imaged person from the e-mail addresses stored in the e-mail address storage device, on the basis of the information detected by the imaged object detection device;

a display device displaying the e-mail addresses acquired by the e-mail address acquisition device as destination candidates of the e-mail with the attached image so as to be selected by the user;

an e-mail address setting device setting an e-mail address selected by the user from the e-mail addresses selectably displayed by the display device as a destination of the e-mail with the attached image; and an association degree calculation device to find an association degree indicating to what extent the imaged person specified by the information detected by the imaged object detection device is associated with the attached image, wherein if a plurality of e-mail addresses are acquired by the e-mail address acquisition device, the display device displays each e-mail address as well as information indicating a rank of the each e-mail address as an e-mail destination candidate, the rank corresponding to the association degree calculated by the association degree calculation device.

* * * * *